(12) United States Patent
Qian et al.

(10) Patent No.: US 11,057,898 B2
(45) Date of Patent: Jul. 6, 2021

(54) METHOD AND APPARATUS FOR GRANT-FREE DATA TRANSMISSION IN WIRELESS COMMUNICATION SYSTEM

(71) Applicant: Samsung Electronics Co., Ltd., Suwon-si (KR)

(72) Inventors: Chen Qian, Beijing (CN); Bin Yu, Beijing (CN); Di Su, Beijing (CN); Qi Xiong, Beijing (CN); Yingjie Zhang, Beijing (CN); Jingxing Fu, Beijing (CN)

(73) Assignee: Samsung Electronics Co., Ltd., Suwon-si ( * ) Notice: Subject to any disclaimer, the term of this patent is extended or adjusted under 35 U.S.C. 154(b) by 0 days.

(21) Appl. No.: 16/347,495

(22) PCT Filed: Nov. 1, 2017

(86) PCT No.: PCT/KR2017/012238
§ 371 (c)(1),
(2) Date: May 3, 2019

(87) PCT Pub. No.: WO2018/084559
PCT Pub. Date: May 11, 2018

(65) Prior Publication Data
US 2020/0059935 A1    Feb. 20, 2020

(30) Foreign Application Priority Data

Nov. 4, 2016 (CN) .......................... 201610962247.0
Feb. 6, 2017 (CN) .......................... 201710067270.8
Sep. 18, 2017 (CN) .......................... 201710843147.0

(51) Int. Cl.
*H04W 52/02* (2009.01)
*H04W 72/04* (2009.01)

(52) U.S. Cl.
CPC ...... *H04W 72/0486* (2013.01); *H04W 72/042* (2013.01); *H04W 72/044* (2013.01); *H04W 72/0413* (2013.01)

(58) Field of Classification Search
None
See application file for complete search history.

(56) References Cited

U.S. PATENT DOCUMENTS

2006/0176845 A1    8/2006  Sarkkinen
2008/0232323 A1*   9/2008  Jeong ................ H04W 72/0406
                                                    370/331

(Continued)

FOREIGN PATENT DOCUMENTS

WO    2015/122701 A1    8/2015
WO    2016/053639 A1    4/2016

OTHER PUBLICATIONS

European Search Report dated Sep. 16, 2019, European Application No. 17867201.0.

(Continued)

*Primary Examiner* — Brandon M Renner
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a grant-free data transmission method. The method includes: receiving resource allocation information for grant-free transmission from a base station; when there is data to be transmitted in a grant-free transmission mode, transmitting uplink data using the grant-free transmission resources according to the resource allocation information; if the transmission of the uplink data cannot be completed within a predefined number of uplink data transmissions, transmitting a dedicated resource request indicator (Continued)

to the base station; receiving dedicated resource allocation information from the base station; and transmitting subsequent uplink data on dedicated resources corresponding to the dedicated resource allocation information. The present disclosure further provides a grant-free data transmission method applied to the base station, a UE and a base station. The technical solution of the present disclosure can improve the data transmission reliability as well as system spectrum utilization ratio.

10 Claims, 9 Drawing Sheets

(56) References Cited

U.S. PATENT DOCUMENTS

| | | | |
|---|---|---|---|
| 2011/0002262 A1* | 1/2011 | Wang | H04L 1/1812 370/328 |
| 2012/0213196 A1 | 8/2012 | Chung et al. | |
| 2013/0308545 A1* | 11/2013 | Lee | H04W 4/70 370/328 |
| 2014/0071873 A1* | 3/2014 | Wang | H04W 72/1284 370/311 |
| 2014/0126499 A1* | 5/2014 | Li | H04L 1/189 370/329 |
| 2014/0254544 A1 | 9/2014 | Kar Kin Au et al. | |
| 2016/0037569 A1* | 2/2016 | Kim | H04W 72/042 455/450 |
| 2016/0219561 A1* | 7/2016 | Bergqvist | H05K 999/00 |
| 2016/0219627 A1 | 7/2016 | Au et al. | |
| 2016/0270053 A1* | 9/2016 | Zeng | H04W 74/08 |
| 2016/0277973 A1* | 9/2016 | Luo | H04W 28/26 |
| 2016/0337867 A1* | 11/2016 | Uchino | H04W 16/14 |
| 2016/0374135 A1* | 12/2016 | Martin | H04W 72/04 |
| 2017/0164242 A1* | 6/2017 | Zhang | H04W 28/26 |
| 2018/0032373 A1* | 2/2018 | Chen | G06F 9/5038 |
| 2018/0092157 A1* | 3/2018 | Chen | H04W 52/028 |
| 2018/0124830 A1* | 5/2018 | Lin | H04W 74/0833 |

OTHER PUBLICATIONS

3GPP TSG RAN WG1 Meeting #86bis. LG Electonics. General procedures for grant-free/grant-based MA. R1-1609228. Lisbon, Portugal, Oct. 9, 2016.

3GPP TSG-RAN WG2 #95bis. Data transmission in low activity state. R2-166284. Discussion and Decision. Huawei, HiSilicon. Kaohsiung, 10-14 Oct. 9, 2016.

International Telecommunication Union; IMT Vision—Framework and overall objectives of the future development of IMT for 2020 and beyond; Radiocommunication Sector of ITU; Recommendation ITU-R M.2083-0; M Series; Mobile, radiodetermination, amateur and related satellite services; Sep. 2015.

International Telecommunication Union; Future technology trends of terrestrial IMT systems; Radiocommunication Sector of ITU; Report ITU-R M.2320-0; M Series; Mobile, radiodetermination, amateur and related satellite services; Nov. 2014.

International Telecommunication Union; Working Document Towards a Preliminary Draft New Report ITU-R M.[IMT.BEYOND2020. Traffic]; Radiocommunication Study Groups; SWG Traffic; MT Traffic estimates beyond year 2020; Document 5D/TEMP/466-E; Oct. 21, 2014.

European Office Action dated Feb. 23, 2021, issued in a counterpart European Application No. 17 867 201.0—1215.

* cited by examiner

[Fig. 1]
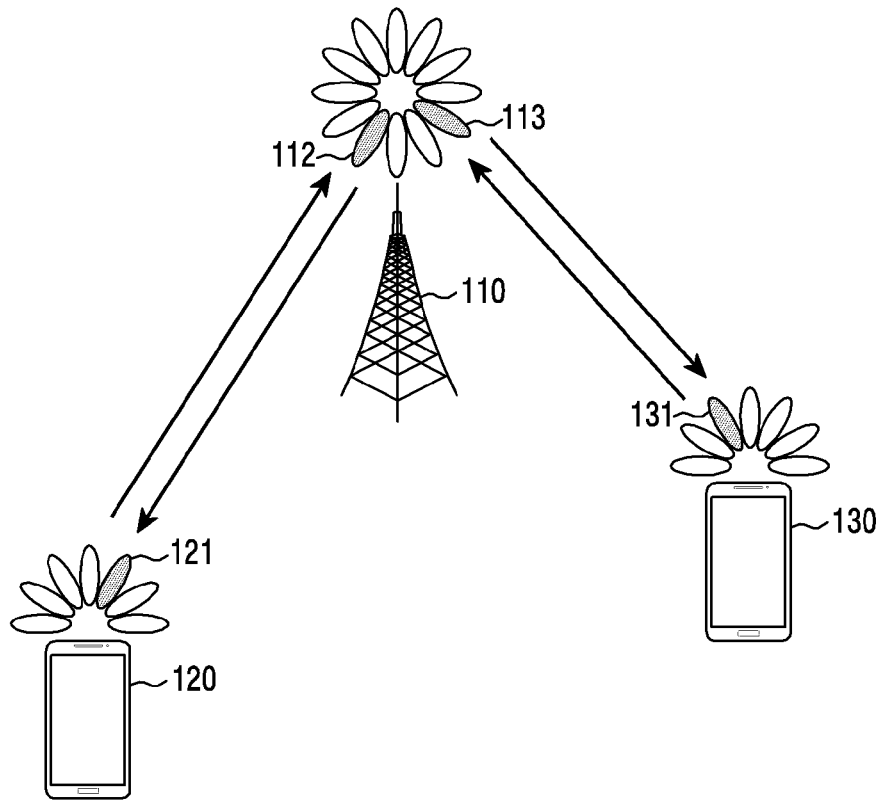
[Fig. 2]
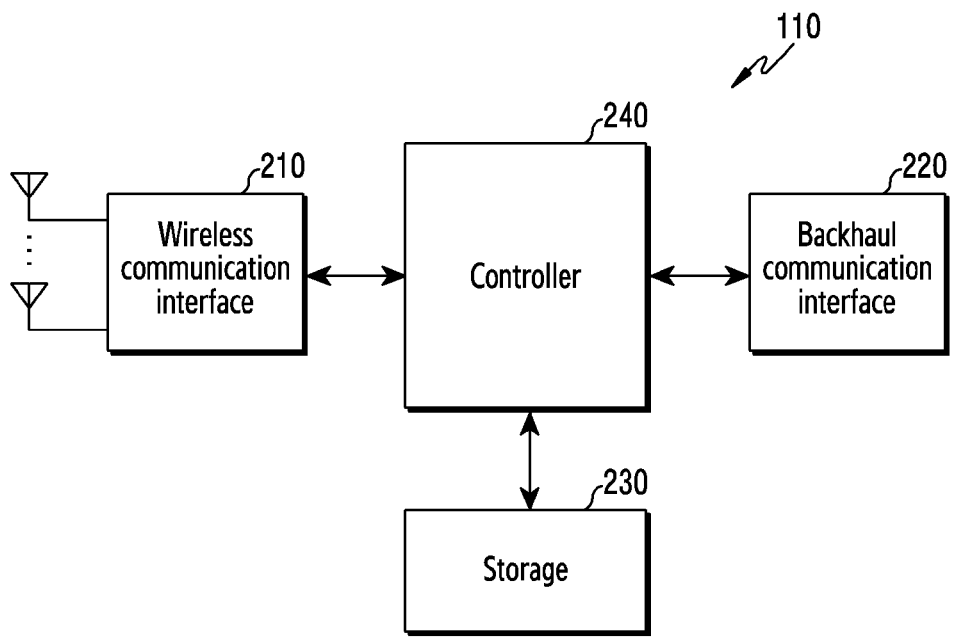

[Fig. 3]
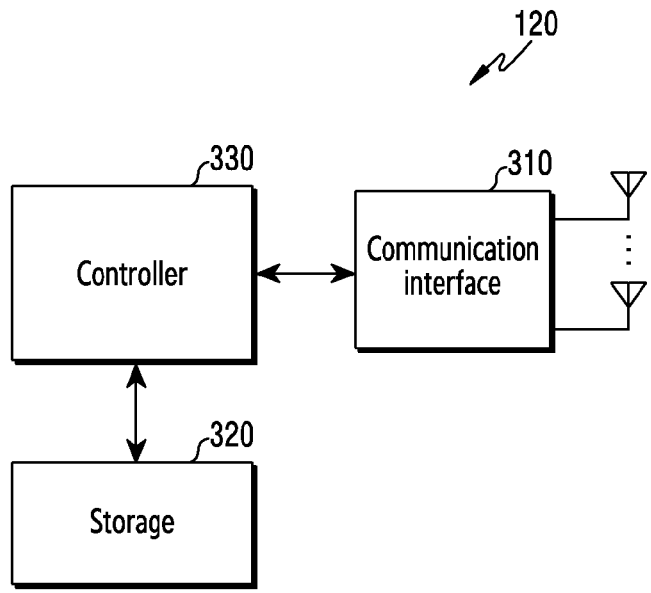
[Fig. 4]
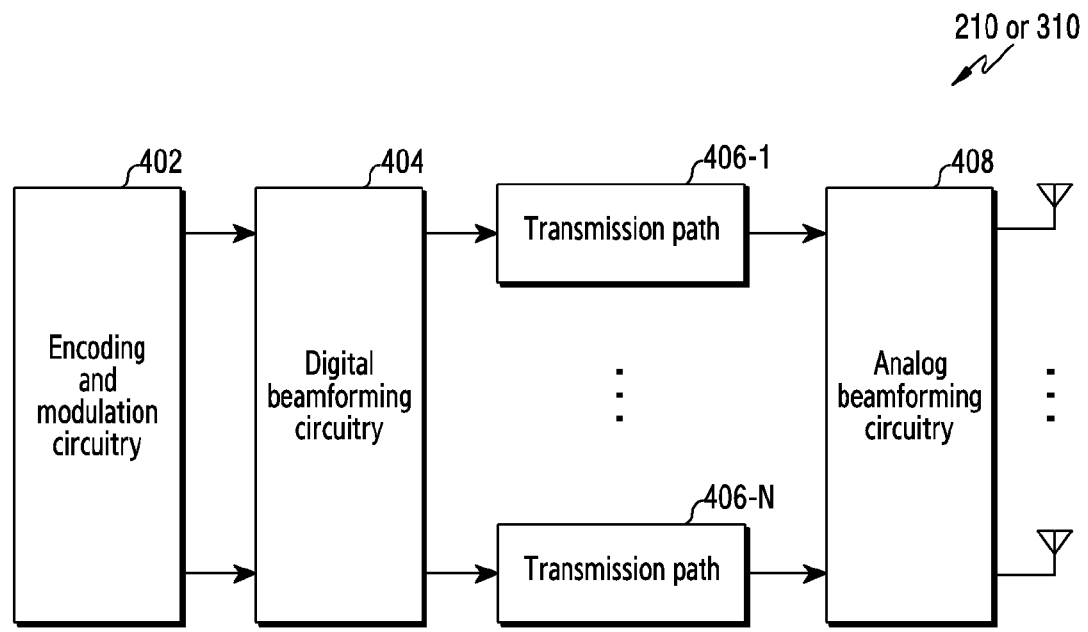

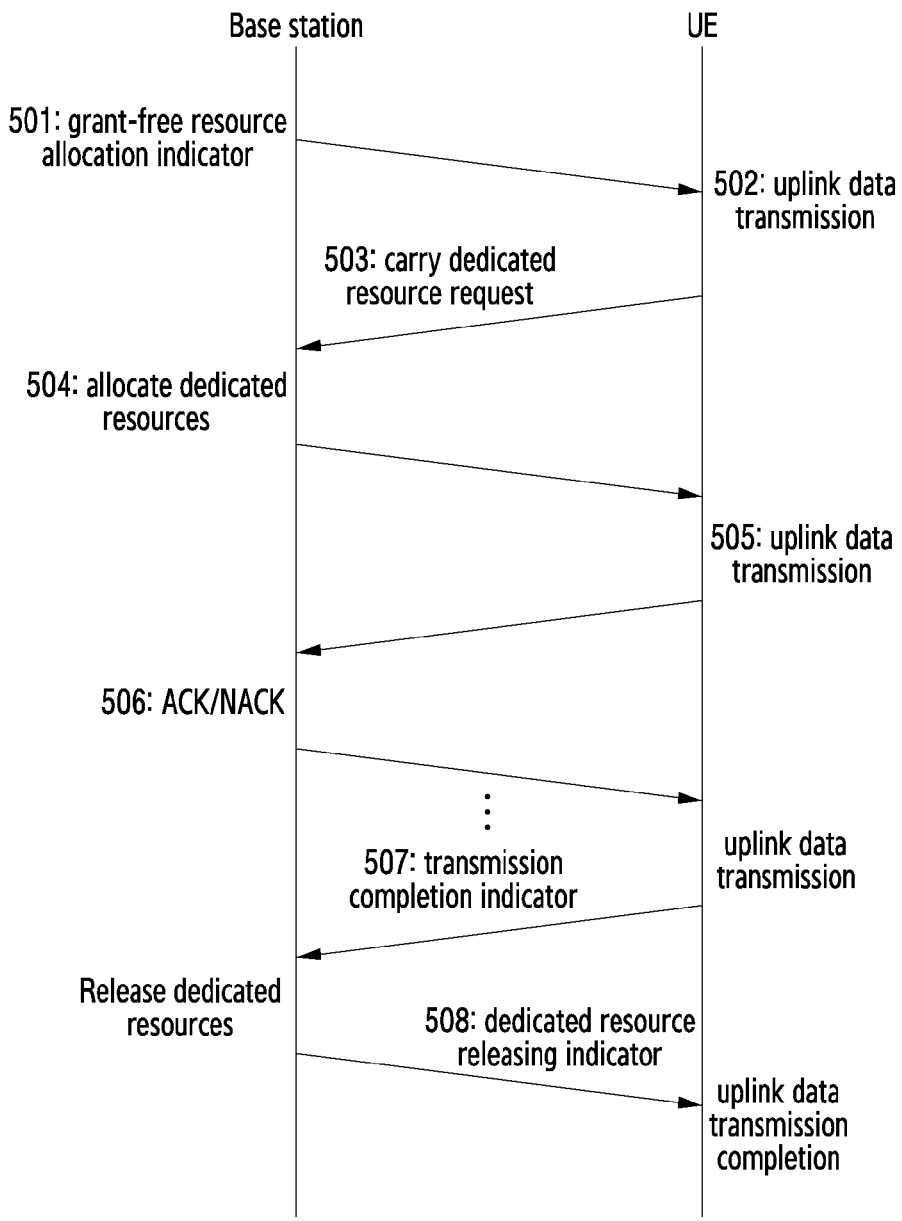
[Fig. 5]

[Fig. 6]
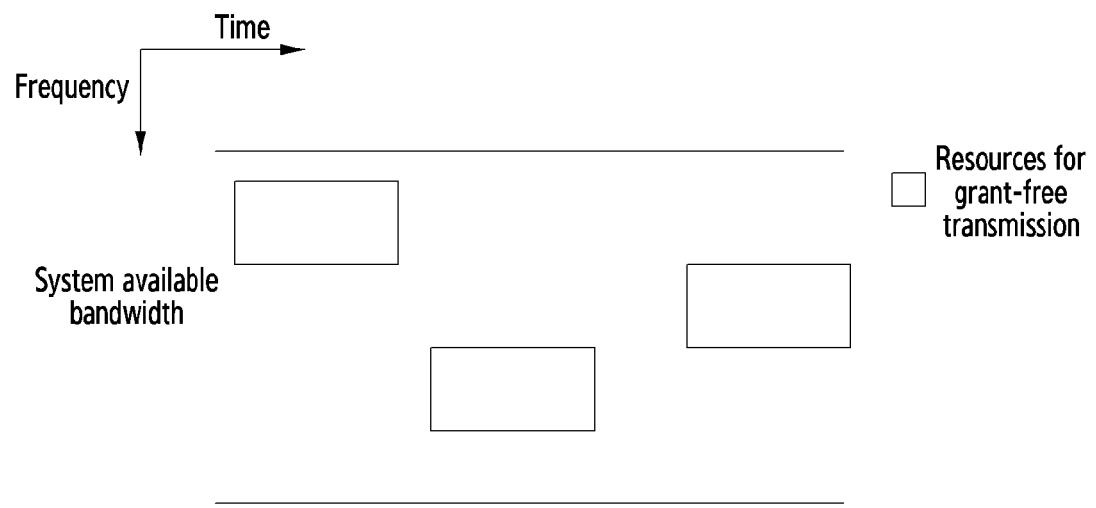
[Fig. 7]
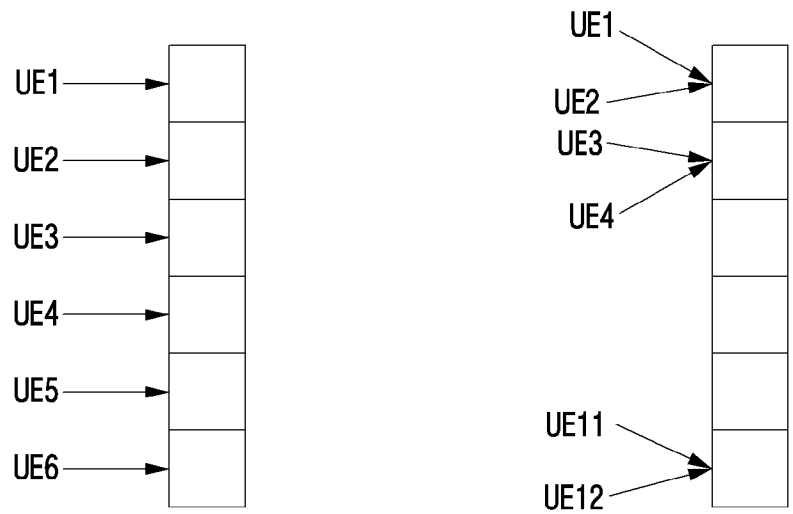

[Fig. 8]
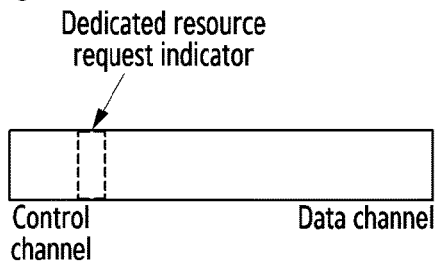
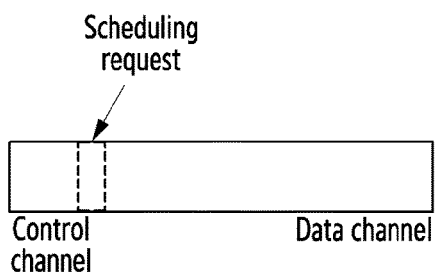
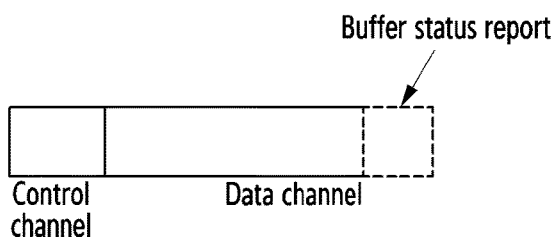
[Fig. 9]
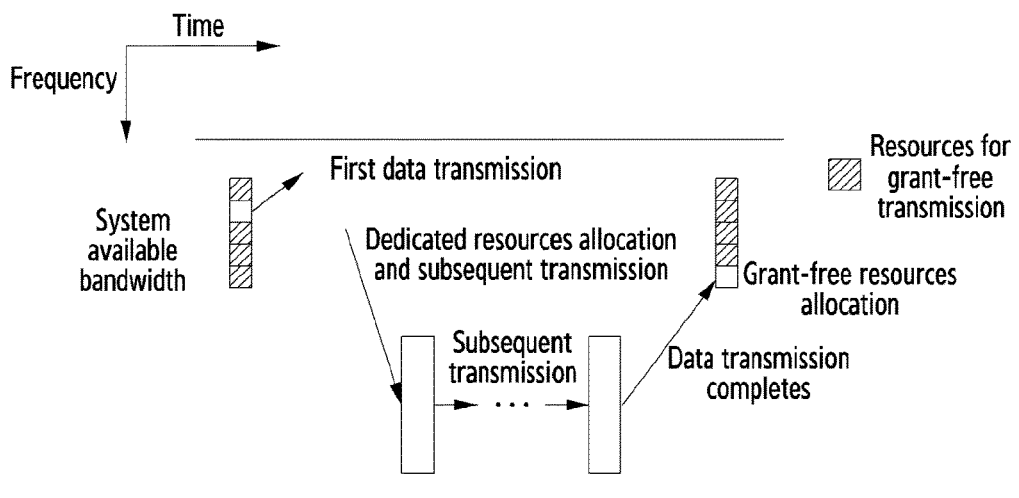

[Fig. 10]
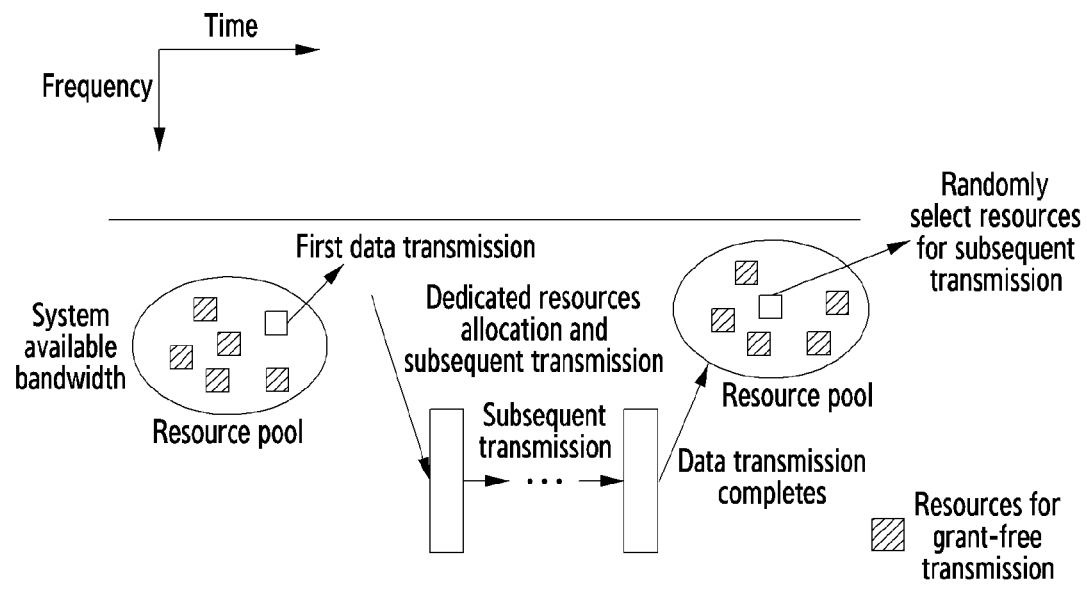
[Fig. 11]
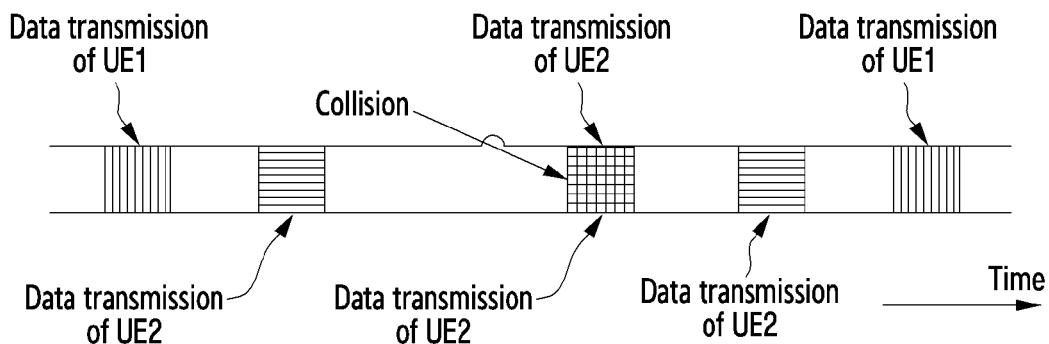
[Fig. 12]
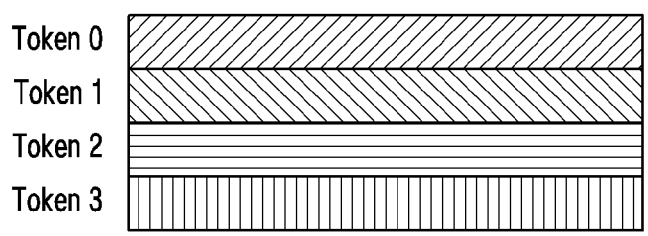

[Fig. 13]
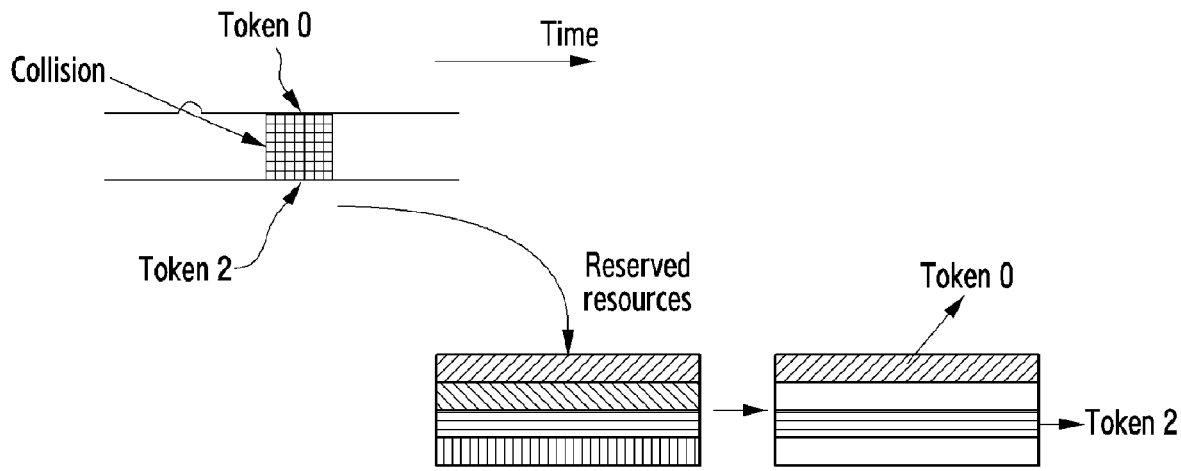
[Fig. 14]
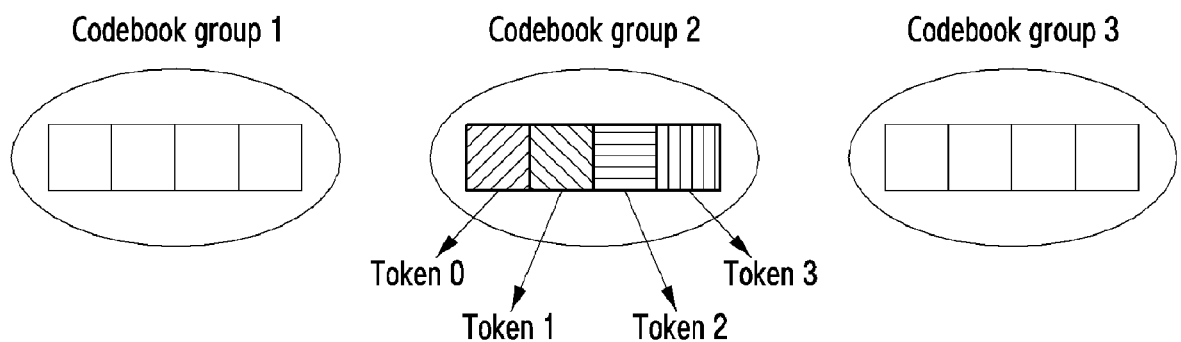
[Fig. 15]
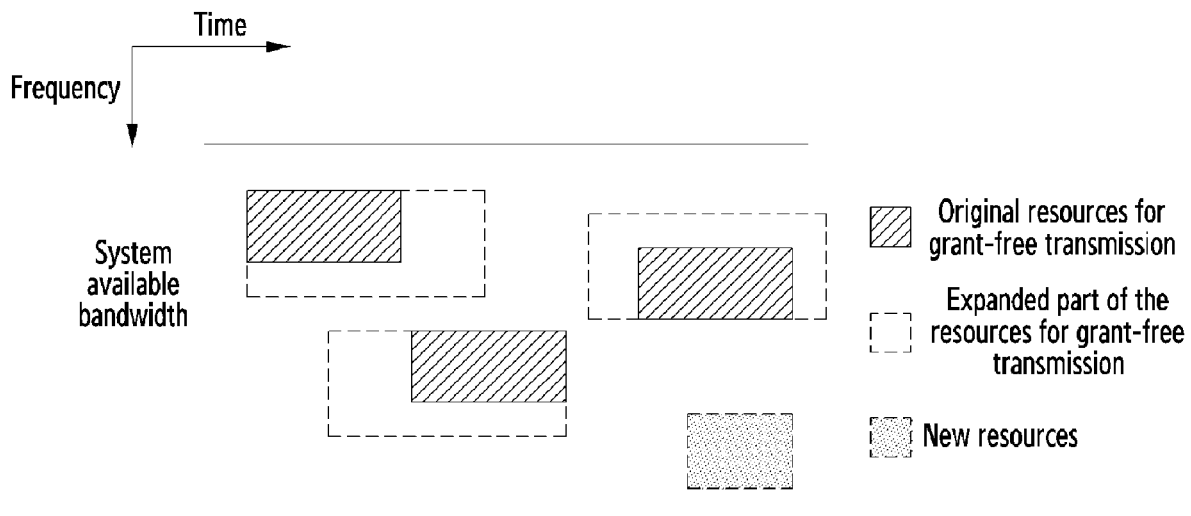

[Fig. 16]
[Fig. 17]
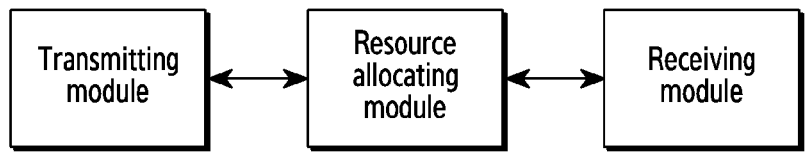
[Fig. 18]
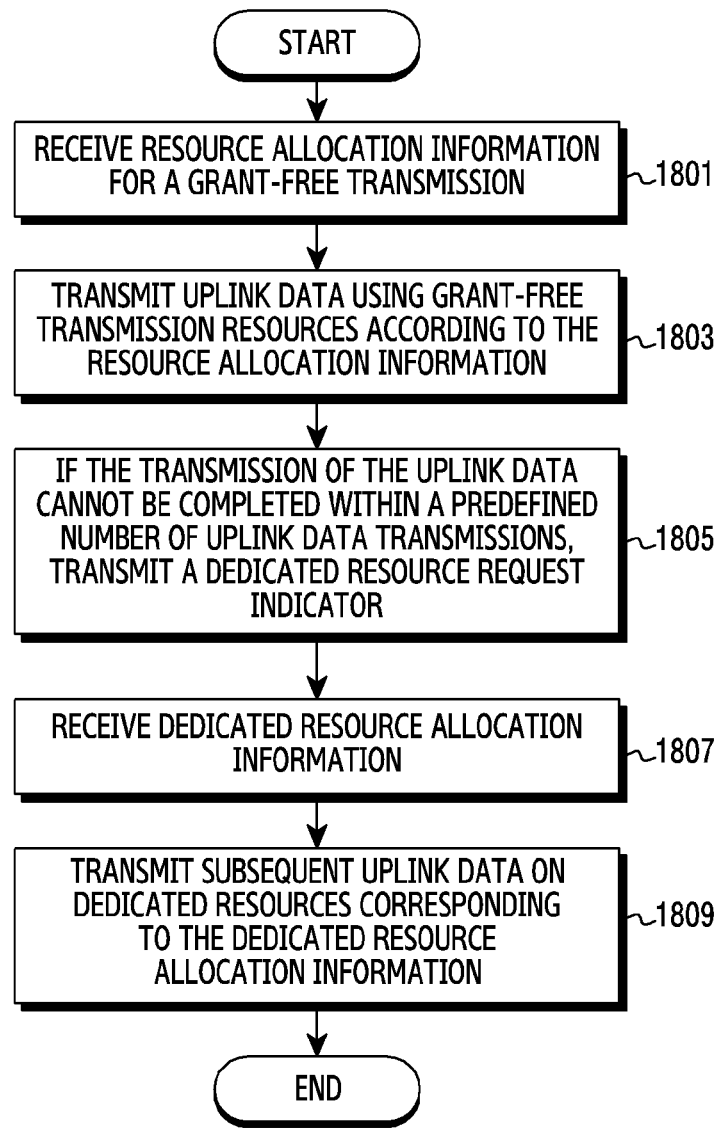

[Fig. 19]
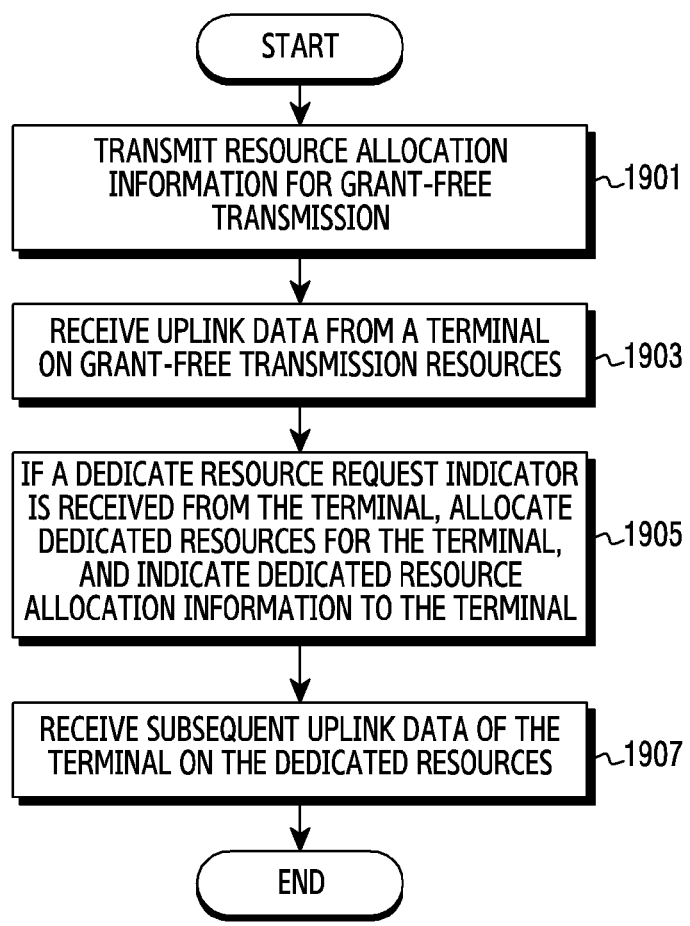

METHOD AND APPARATUS FOR GRANT-FREE DATA TRANSMISSION IN WIRELESS COMMUNICATION SYSTEM

TECHNICAL FIELD

The present disclosure relates to wireless communications technologies, more particularly to a grant-free data transmission method and an apparatus.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, various communication schemes are discussed. For example, a grant-free communication scheme for transmitting data without granting an uplink transmission is proposed. Furthermore, various discussions for supporting the grant-free communication efficiently are underway.

DISCLOSURE OF INVENTION

Technical Problem

The present disclosure provides a grant-free data transmission method and apparatus, so as to improve data transmission reliability as well as system spectrum utilization ratio.

Solution to Problem

The present disclosure provides a grant-free data transmission method, applied to a User Equipment (UE), including:

receiving resource allocation information for grant-free transmission from a base station;

when there is data to be transmitted in a grant-free transmission mode, transmitting uplink data using the grant-free transmission resources according to the resource allocation information;

if the transmission of the uplink data cannot be completed within a predefined number of uplink data transmissions, transmitting a dedicated resource request indicator to the base station;

receiving dedicated resource allocation information from the base station; and transmitting subsequent uplink data on dedicated resources corresponding to the dedicated resource allocation information.

In some embodiments, the UE is in a connected mode and has finished a random access procedure;

the process of receiving the resource allocation information for the grant-free transmission from the base station includes: receiving grant-free resource allocation indication transmitted by the base station via system information, a higher layer signaling or a control channel; or, receiving an available resource pool configured by the base station via system information, a higher layer signaling or a control channel, wherein the resource pool includes the grant-free transmission resources;

the dedicated resource allocation information is identified by UE identification information.

In some embodiments, the UE is in a non-connected mode, the process of receiving the resource allocation information for the grant-free transmission from the base station includes: receiving an available resource pool configured by the base station via system information, a higher layer signaling or a control channel, wherein the resource pool includes the grant-free transmission resources;

the dedicated resource allocation information is identified by information of resources used by the UE during a last uplink data transmission.

In some embodiments, the method further includes:

when receiving the grant-free resource allocation indicator from the base station, receiving token bits corresponding to the UE from the base station;

after transmitting the uplink data on the dedicated resources, detecting reserved resource allocation information, determining the reserved resources allocated for the UE by the base station according to the detected reserved resource allocation information and the token bits corresponding to the UE, and transmitting data on the reserved resources.

In some embodiments, the detecting the reserved resource allocation information includes:

counting a number of retransmission times, if the number of retransmission times exceeds a maximum retransmission number, detecting the reserved resource allocation information according to information of the resources used by a last data transmission;

or, if an ACK is not received from the base station before a pre-defined dropping time expires, detecting the reserved resource allocation information according to information of the resources used for a last uplink data transmission;

or, detecting the reserved resource allocation information according to information of the resources used for a last uplink data transmission.

In some embodiments, the method further includes:

indicating data transmission completion to the base station in a last uplink data transmission via a data transmission completion indicator.

The present disclosure also provides a UE, including: a transmitting module, a resource requesting module and a receiving module; wherein the transmitting module is to receive resource allocation information for grant-free transmission from a base station, wherein when there is data to be transmitted in a grant-free transmission mode, transmitting uplink data on the grant-free transmission resources according to the resource allocation information;

the resource requesting module is to transmit a dedicated resource request indicator to the base station when the transmission of the uplink data cannot be completed within a predefined number of uplink transmission;

the receiving module is to receive dedicated resource allocation information; and the transmitting module is further to transmit subsequent uplink data on dedicated resources corresponding to the dedicated resource allocation information.

The present disclosure also provides a grant-free data transmission method, applicable for a base station, including:

transmitting resource allocation information for grant-free transmission;

receiving uplink data from a User Equipment (UE) on the grant-free transmission resources;

if a dedicate resource request indicator is received from the UE, allocating dedicated resources for the UE, and indicating dedicated resource allocation information to the UE; and receiving subsequent uplink data of the UE on the dedicated resources.

In some embodiments, the process of transmitting the resource allocation information for the grant-free transmission includes: the base station allocating the grant-free transmission resources for the UE, and transmitting resource allocation information for the grant-free transmission to the UE via system information, a higher layer signaling or a control channel; or, the base station configuring an available resource pool via system information, a higher layer signaling or a control channel, the available resource pool includes the grant-free transmission resources;

the process of indicating the dedicated resource allocation information to the UE includes: identifying the UE by UE identification information; or, identifying the UE according to information of resources used by the UE during a last uplink data transmission.

In some embodiments, the process of the base station allocating the grant-free transmission resources for the UE includes: the base station allocating the same grant-free transmission resources for different UEs, and allocating different token bits for the different UEs to distinguish the different UEs;

the method further includes: counting a number of retransmission times of the UE on the grant-free transmission resources, if the number of retransmission times exceed a predefined maximum retransmission number, transmitting reserved resource allocation information to the UE allocated with the grant-free transmission resources;

or, counting time from the time that a data packet is received on the grant-free transmission resources but is failed to be decoded, if the counted time exceeds a dropping time, transmitting reserved resource allocation information to the UE allocated with the grant-free transmission resources;

the process of transmitting the reserved resource allocation information to the UE allocated with the grant-free transmission resources includes: indicating a reserved resource reference index to the UE, wherein the base station determines reserved resources allocated for the UE according to the reserved resource reference index and token bits of the UE.

In some embodiments, the method further includes:

within a predefined time period, if the reserved resources are not used by the UE, releasing the reserved resources.

In some embodiments, the method further includes:

when receiving a data transmission completion indicator from the UE, releasing the dedicated resources.

In some embodiments, the method further includes:

dividing available resources into schedule-based transmission resources and grant-free transmission resources;

the base station detecting a network status, and re-allocating the schedule-based transmission resources and the grant-free transmission resources according to a measurement result.

In some embodiments, the process of base station detecting the network status includes any one of:

the base station detecting load of UEs in the grant-free transmission mode, if the load of the UEs in the grant-free transmission mode is higher than a pre-defined first threshold, determining to add the grant-free transmission resources;

the base station detecting and collecting statistics of signal-to-noise ratios of uplink data transmitted by UEs in the grant-free transmission mode, if an average signal-to-noise ratio of the uplink data of the UEs is lower than a pre-defined second threshold, determining to add the grant-free transmission resources;

the base station detecting and collecting statistics of numbers of retransmission numbers of UEs in the grant-free transmission mode, if an average number of retransmission times of the UEs in the grant-free transmission mode is higher than a pre-defined third threshold, determining to add the grant-free transmission resources;

the base station detecting load of UEs in the schedule-based transmission mode, if the load of the UEs in the schedule-based mode is higher than a pre-defined fourth threshold, determining to add the schedule-based transmission resources; and the base station detecting and collecting statistics of an average scheduling delay of UEs in the schedule-based transmission mode, if the average transmission delay of the UEs in the schedule-based transmission mode is larger than a pre-defined fifth threshold, determining to add the schedule-based transmission resources.

The present disclosure also provides a base station, including: a receiving module, a resource allocating module and a transmitting module; wherein the transmitting module is to transmit resource allocation information for grant-free transmission, and the receiving module is to receive uplink data transmitted by a User Equipment (UE) on the grant-free transmission resources;

if a dedicated resource request indicator is received from the UE, the resource allocating module is to allocate dedicated resources for the UE, and indicate dedicated resource allocation information to the UE; and the receiving module is further to receive subsequent uplink data transmitted by the UE on the dedicated resources.

In view of the above technical solution, the present disclosure realizes switching between schedule-based transmission and grant-free transmission through allocating dedicated resources for the UE during the grant-free transmission. Thus, it is possible to ensure the latency and reliability of subsequent data transmission via the dedicated resources, while still keeping the low transmission delay advantage of the grant-free transmission. Further, through the dynamic resource allocation, the problem of low resource utilization ratio in conventional grant-free transmission similar as semi-persistent scheduling can be solved. Meanwhile, the solution provided by the present disclosure solves collisions in the grant-free transmission through the allocation of the dedicated resources.

It can be seen that, the present disclosure improves data transmission reliability as well as spectrum utilization ratio through reasonable resource allocation and optimized scheduling procedure. As such, the massive connection requirement in the mMTC scenario and the low-latency and high-reliability data transmission requirement in the URLLC scenario can be met.

Advantageous Effects of Invention

Various embodiments of the present disclosure provide an improved system performance.

BRIEF DESCRIPTION OF DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a flowchart illustrating a grant-free data transmission method according to various embodiments of the present disclosure;

FIG. 6 is schematic diagram illustrating a system resource allocation manner according to various embodiments of the present disclosure;

FIG. 7 is a schematic diagram illustrating a resource allocation manner for the grant-free transmission according to various embodiments of the present disclosure;

FIG. 8 shows several embodiments of dedicated resource request indication according to the present disclosure;

FIG. 9 is a flowchart illustrating data transmission, and resource allocation and releasing procedures according to various embodiments of the present disclosure;

FIG. 10 is a flowchart illustrating a data transmission, and resource allocation and releasing procedures when the UE randomly selects resources according to various embodiments of the present disclosure;

FIG. 11 is a schematic diagram illustrating collision of uplink data according to various embodiments of the present disclosure;

FIG. 12 is a schematic diagram illustrating a resource allocation manner for the OFDM according to various embodiments of the present disclosure;

FIG. 13 is a schematic diagram illustrating a resource allocation manner based on token bits according to various embodiments of the present disclosure;

FIG. 14 is a schematic diagram illustrating a resource allocation manner based on token when codebook group is adopted according to various embodiments of the present disclosure;

FIG. 15 is a schematic diagram illustrating expansion of the grant-free transmission resources according to various embodiments of the present disclosure;

FIG. 16 is a schematic diagram illustrating a structure of a UE according to various embodiments of the present disclosure;

FIG. 17 is a schematic diagram illustrating a structure of a base station according to various embodiments of the present disclosure;

FIG. 18 is a flowchart for operation of a UE according to various embodiments of the present disclosure; and FIG. 19 is a flowchart for operation of a base station according to various embodiments of the present disclosure.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a grant-free data transmission in a wireless communication system.

The terms referring to grant-free, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5$^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

With rapid development of information industry, especially increasing requirements from mobile Internet and Internet of things (IoT), mobile communication techniques are facing unprecedented challenges. According to International Telecommunication Union (ITU) report ITU-R M.[IMT.BEYOND 2020.TRAFFIC], it can be predicted that as of 2020, mobile service amount will increase 1000 times compared with that in 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description including requirement prospect, application scenarios and various important performances of 5G. With respect to new requirements of 5G, the ITU report ITU-R M.[IMT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

The requirement of supporting massive machine-type communication (mMTC) is proposed in 5G, there will be millions of connections per square meter, which is far higher than the current connection density supported by the current standards. The service requirements of the large amount of connections may lead to high cost of original communication procedure of LTE, especially for the schedule-based data transmission such as random access, scheduling request. This may lead to a signaling storm and a large part of bandwidth may be used for transmitting signaling instead of data, which greatly decreases the spectrum efficiency and effectiveness of the system and also increases power consumption of the UE. This goes against to the requirement of power consumption in mMTC services.

In addition, ultra-reliable low-latency communication (URLLC) proposed in 5G has requirements on both latency and reliability. It requires an end-to-end latency less than 1 ms and a block error rate lower than $10^{-5}$. It also gives challenges to the conventional LTE communication procedures. For example, although the conventional schedule-based communication procedure is able to decrease block error rate of data transmission by decreasing code rate, increasing bandwidth or time-domain repeating, the complicated scheduling in the conventional LTE communication procedure will increase the data transmission delay, which is unfavorable for meeting the latency requirement of the URLLC scenario.

Grant-free transmission is able to solve the signaling cost and delay problem caused by the schedule-based transmission. However, no matter whether UEs randomly select resources or a resource allocation manner based on semi-persistent scheduling is adopted, there inevitably exists UE conflict. Therefore, for the grant-free transmission, it is a problem to be solved in the standardization of 5G that how to tradeoff between transmission reliability and resource utilization ratio, and transmission reliability and transmission delay.

At present, there may be two solutions for implementing the grant-free transmission.

1. The base station configures a resource pool used for the grant-free transmission. When a UE has data to be transmitted, the UE randomly selects a resource for the grant-free transmission to implement uplink data transmission. The resources include at least one of: time resources, multiple access signatures, uplink demodulation reference signals.

2. The base station allocates resources for grant-free transmission for UEs adopting grant-free transmission. The resources include at least one of: time-frequency resources, multiple access signatures, uplink demodulation reference signals, when a UE needs to transmit data using the grant-free mode, the UE transmits using the resources allocated by the base station.

In the foregoing description, the time-frequency resources refer to those specially allocated for the grant-free transmission. The multiple access signatures refer to the orthogonal or non-orthogonal divided multiple access signatures, including but not limited to: orthogonal time-frequency resources, orthogonal code sequences, code books, interleave sequences, scrambling sequences, etc.

In the above two grant-free transmission manners, if the first manner is adopted to implement the grant-free transmission, the UE may operate in a connected mode (i.e. a random access procedure is completed) or a non-connected mode. Since multiple UEs select resources from the same resource pool with the same probability, collide inevitably happens to the uplink transmissions of the UEs, i.e., the multiple UEs select the same resources for the uplink data transmission. The resources include at least one of: time-frequency resources, multiple access signatures, uplink demodulation reference signals, which may degrade the reliability of the data transmission. If the second grant-free transmission manner is adopted, the base station may control the number of UEs whose data may collide through control the number of UEs allocated with the same resources, the resources include at least one of: time-frequency resources, multiple access signatures, uplink demodulation reference signals, which increases the reliability of the data transmission at a price of spectrum efficiency and resource utilization ratio.

It can be seen that, in the conventional grant-free transmission manners, the first manner may degrade the reliability of the data transmission. The second manner may decrease the spectrum efficiency and spectrum utilization ratio. Thus, the convention grant-free transmission cannot reach a balance between the data transmission reliability and spectrum utilization ratio.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit resource allocation information for grant-free transmission, receive uplink data from a terminal on grant-free transmission resources, if a dedicate resource request indicator is received from the terminal, allocate dedicated resources for the terminal, and indicating dedicated resource allocation information to the terminal, and receive subsequent uplink data of the terminal on the dedicated resources. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive resource allocation information for a grant-free transmission from a base station, transmit uplink data using grant-free transmission resources according to the resource allocation information to the base station, if the transmission of the uplink data cannot be completed within a predefined number of uplink data transmissions, transmit a dedicated resource request indicator to the base station, receive dedicated resource allocation information from the base station, and transmit subsequent uplink data on dedicated resources corresponding to the dedicated resource allocation information to the base station. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

The present disclosure will be described in detail hereinafter with reference to accompanying drawings and embodiments to make the technical solution and merits therein clearer.

Embodiments of the present disclosure provide a grant-free data transmission method. FIG. 5 shows a flowchart of the method. The method includes the following.

In step 501, a base station transmits resource allocation indication for grant-free transmission, and allocates grant-free transmission resources for a UE. The resources include at least one of: time-frequency resources, multiple access signatures, and uplink demodulation reference signals. The base station may allocate the same time-frequency resources and/or multiple access signatures and/or uplink demodulation reference signals for different UEs.

In step 502, when the UE has data to be transmitted in the grant-free transmission mode, the UE transmits uplink data using at least one of the following resources allocated by the base station: the time-frequency resources, the multiple access signatures, and the uplink demodulation reference signals. If the transmission of the data of the UE can be completed within a predefined number of transmissions, no additional operation is required. If the transmission of the data of the UE cannot be completed within the predefined number of uplink data transmissions, in step 503, the UE inserts a dedicated resource request indicator in the uplink data.

In step 504, the base station detects and decodes the uplink data. If it finds that the uplink data carries the dedicated resource request indicator, the base station allocates dedicated resources for the UE, and transmits resource allocation information when transmitting an ACK. The dedicated resources may include at least one of: dedicated time-frequency resources, multiple access signatures, and uplink demodulation reference signals. The dedicated resources are resources used for a schedule-based transmission.

In step 505, after receiving the ACK and the corresponding resource allocation information, the UE transmits uplink data on the allocated dedicated time-frequency resources using the dedicated multiple access signatures and/or uplink demodulation reference signals allocated by the base station. The transmission of the data may be implemented in a schedule-based mode or a grant-free mode.

In step 506, after detecting and decoding the uplink data, the base station transmits a corresponding ACK/NACK.

In step 507, in a last uplink data transmission, the UE transmits a data transmission completion indicator in the uplink data.

In step 508, after detecting the data transmission completion indicator in the uplink data, the base station transmits an ACK and releases the dedicated resources.

Now, the UE has finished the uplink data transmission and the procedure ends.

Through allocating the resources used for grant-free transmission in step 501 and allocating the dedicated resources in step 504, the solution provided by the embodiments of the present disclosure is able to ensure a transmission delay via the grant-free mode of the first transmission and ensure the reliability via the dedicated resources allocated during the subsequent transmission. As such, a balance between the reliability, transmission delay ad resource utilization ratio is realized.

Hereinafter, the technical solution provided by the present disclosure is described with reference to several embodiments.

Embodiment 1

In this embodiment, a grant-free data transmission method is described with reference to a detailed system.

The system divides available time-frequency resources into time-frequency resources used for grant-free transmission and time-frequency resources used for schedule-based transmission. The two kinds of resources do not overlap with each other, as shown in FIG. 6.

In FIG. 6, the parts in the rectangles denote the time-frequency resources allocated to the grant-free transmission, and the remaining part denotes the time-frequency resources allocated to the schedule-based transmission. The resource allocation manner is indicated to UEs served by the base station via a broadcast channel or a higher layer signaling configuration.

After the UE completes uplink synchronization via a random access procedure, the base station allocates resources for the UE for grant-free transmission. The resources include: time-frequency resources, multiple access signatures and uplink demodulation reference signals. If the system adopts an orthogonal multiple access manner, e.g., Orthogonal Frequency Division Multiple Access (OFDMA) or orthogonal codeword-based Code Division Multiple Access (CDMA), the multiple access signatures include the time-frequency resource blocks or orthogonal codewords allocated to the UE. If the system adopts a non-orthogonal multiple access manner, e.g., Interleave-Grid Multiple Access (IGMA), Sparse Code Multiple Access (SCMA), etc., the multiple access signatures include interleave sequences or code books. The base station may allocate the same time-frequency resources and/or multiple access signatures and/or uplink demodulation reference signals to different UEs, and may control potential collisions through controlling the number of UEs allocated with the same time-frequency resources and/or multiple access signatures and/or uplink demodulation reference signals, so as to control the reliability of the system.

Hereinafter, the OFDMA is taken as an example to describe the allocation of the grant-free transmission resources. Suppose that the time-frequency resources allocated by the system for the grant-free transmission include 6 consecutive Physical Resource Blocks (PRBs), FIG. 7 shows two possible manners for allocating the grant-free transmission resources.

In the left figure of FIG. 7, each UE (e.g. UE 1-UE 6) is allocated with a different PRB. At this time, each UE transmits uplink data using the PRB allocated to it when having a data transmission requirement. Since the resources allocated to different UEs are orthogonal, there is no collision among the uplink data transmissions of them, which is able to ensure the high reliability of the data transmission. Meanwhile, since each orthogonal resource is allocated to only one UE, when a UE does not have data to be transmitted, the resource allocated to the UE cannot be utilized and is wasted.

In the right figure of FIG. 7, two UEs are allocated with the same orthogonal resources. For example, UE 1 and UE 2 are allocated with the same resources. Therefore, when the two UEs transmit uplink data at the same time, a collision happens, which may decrease the reliability of the transmission. On the other hand, since the two UEs use the same orthogonal resources, the possibility of resource waste is decreased. Thus, the system resource utilization ratio is increased.

It should be noted that, the example as shown in FIG. 7 may also be applied in other orthogonal or non-orthogonal multiple access manners. At that time, the rectangles denote PRBs shown in FIG. 7 may denote the multiple access signatures of other multiple access manners.

In order to realize a balance between the reliability and the resource utilization ratio, after the UE has transmitted uplink data for a predefined number of times (without special explanation, suppose the predefined number is 1) using the allocated time-frequency resources and the multiple access signatures, a dedicated resource request indicator is carried in the data. The indicator is used for indicating to the base station whether the UE has more data to be transmitted and requesting to allocate dedicated resources for the subsequent data to be transmitted. In particular, the indicator may be a 1-bit dedicated resource request indicator in an uplink control channel, e.g., a binary 1 denotes that dedicated resources are required to be allocated; a binary 0 denotes that no dedicated resources are required and the current transmission is capable of completing the transmission of all data. Alternatively, the indicator may be denoted by a scheduling request. If scheduling is required, it indicates that there is more data to be transmitted and dedicated resources need to be allocated. If no scheduling is required, it indicates that there is no more data to be transmitted and no dedicated resources need to be allocated. Alternatively, the indicator may be configured by a higher layer signaling, e.g., a buffer status report transmitted in a data channel. If the buffer is not empty, it indicates that there is more data to be transmitted and the dedicated resources need to be allocated. If the buffer is empty, it indicates that there is no more data to be transmitted, and there is no need to allocate dedicated resources. FIG. 8 shows some examples of the above manners.

The base station detects and decodes the received uplink data. If successfully detecting and decoding the uplink data, the base station transmits an ACK signal in a corresponding feedback channel. The feedback channel is associated with the time-frequency resources, the multiple access signatures and the uplink demodulation reference signals on which the base station successfully detects the data. If the successfully detected uplink data includes a dedicated resource request indicator, the base station allocates dedicated time-frequency resources and/or multiple access signatures and/or uplink demodulation reference signals for the UE. If the orthogonal multiple access manner is adopted, the dedicated resources may include any one of the following.

1. Dedicated time and/or frequency resources;
2. Time-frequency resources shared with other UEs, with dedicated orthogonal codeword resources and dedicated uplink demodulation reference signals, etc.

If the non-orthogonal multiple access manner is adopted, the dedicated resource may include: time-frequency resources shared with other UEs, with dedicated multiple access signatures such as codebook, interleave, etc., and dedicated uplink demodulation reference signals.

It should be noted that, the multiple access manner used by the first time transmission and that used after the dedicated resources are allocated may be the same or different. For example, the first transmission adopts the grant-free mode, and the non-orthogonal multiple access manner is adopted, so as to reduce delay and increase the number of UEs can access. After the dedicated resources are allocated, the orthogonal multiple access manner is adopted to improve reliability of the data transmission. In other embodiments, the same multiple access manner may be adopted for the first transmission and after the dedicated resources are allocated.

After the dedicated resources are allocated to the UE, dedicated resource allocation information is transmitted to the UE together with the ACK signal. In another manner, the ACK signal is transmitted in the dedicated feedback channel, whereas the dedicated resource allocation information is transmitted to the UE in a downlink control channel, a broadcast channel or via higher layer signaling. Further, the multiple access signatures, the time-frequency resources and/or the uplink demodulation reference signals allocated to the UE during the first transmission are released and allocated to other UEs.

After a predefined time period since the UE transmits the uplink data, the UE detects on the feedback channel. If ACK signal is detected, the UE keeps on reading the corresponding dedicated resource allocation information from the feedback channel, the downlink control channel or the higher layer signaling. The subsequent data transmission of the UE is implemented on the allocated dedicated resources. The subsequent data of the UE may be transmitted via any one of the following manners:

a. The grant-free transmission mode is still adopted. Each time the UE finishes physical layer operations such as coding and modulation to the data to be transmitted, the data is directly transmitted using the allocated dedicated resources. This is similar as implementing the grant-free data transmission in the semi-persistent scheduling mode. Meanwhile, since the resources are dedicated, HARQ retransmission for the uplink data is convenient. For example, a synchronous HARQ may be adopted, i.e., after the uplink data is transmitted, ACK/NACK signal is transmitted after m TTI, and the data may be retransmitted after another n TTI. Or, an asynchronous HARQ may be adopted, i.e., an index of the transmitted data packet and the corresponding ACK/NACK information are provided to the UE in the downlink control channel corresponding to the dedicated resources. If the UE determines that retransmission is required, the index of the data packet is carried in the retransmitted data packet.

b. The schedule-based transmission mode is adopted. When the UE has more uplink data to be transmitted, the UE firstly transmits a scheduling request, and transmits the uplink data after receiving a corresponding uplink grant from the base station.

Compared with the schedule-based transmission mode, the first grant-free transmission mode has less delay, and due to the using of the dedicated resources, the data transmission reliability can be improved via the HARQ retransmission.

After finishing the data transmission, the UE notifies the base station to release the dedicated resources. In one embodiment, 1-bit subsequent data transmission indicator may be carried on the uplink control channel relevant to the uplink data. For example, if the indicator is 1, it indicates that there is more data to be transmitted. If the indicator is 0, it indicates that the data transmission has been finished and the dedicated resources can be released.

In another embodiment, during each uplink transmission, a buffer status report (BSR) may be transmitted on the data channel, to notify the base station the amount of data remained in the buffer. If the amount of remained data is 0, it indicates that there is no more data to be transmitted and the base station can release the dedicated resources.

After successfully detecting the data and finding that the UE using the dedicated resources has no more data to be transmitted, the base station transmits an ACK signal and releases the dedicated resources. The base station configures the released resources as available resources or allocates the resources to other UEs. Meanwhile, the base station allocates grant-free resources for the UE for a next first time transmission, including time-frequency resources and/or multiple access signatures and/or uplink demodulation reference signals. The resource allocation information is transmitted to the UE via a downlink control channel or a higher layer signaling.

After the UE finishes the transmission of a last data packet, the UE detects on a corresponding feedback channel. If NACK information is detected, it indicates that the last data packet is not successfully transmitted. HARQ retransmission of the data packet is performed on the dedicated resources. If ACK information is detected on the feedback channel, it indicates that the last data packet has been successfully transmitted, the UE obtains the resources for the next time grant-free transmission from the downlink control channel or reading higher layer signaling configuration.

FIG. 9 shows the above resource allocation and releasing procedure.

It should be noted that, the embodiment as shown in FIG. 9 is applicable for the OFDM-based orthogonal multiple access manner. For other types of multiple access manners, the embodiment as shown in FIG. 9 is also applicable, but the rectangle in FIG. 9 denotes the multiple access signatures and/or uplink demodulation reference signals. In FIG. 9, resource 2 is allocated to the UE for the first transmission. After the first transmission is completed, the base station releases the resource 2 and allocates dedicated resources for the UE, and allocates the resource 2 to other UEs. This UE transmits remaining data using the dedicated resources. After the transmission of the remaining data is completed, the base station releases the dedicated resources and allocates resources for a next first time grant-free transmission for the UE. It should be noted that, after this procedure, the resources used by the UE for the first transmission may be different from the resources for next time grant-free transmission allocated by the base station.

In addition, it should be noted that, in the OFDM-based orthogonal multiple access manner shown in FIG. 9, in another embodiment, the same time-frequency resources may be allocated to multiple UEs semi-persistently. For the multiple UEs allocated with the same time-frequency resources, the base station allocates different reference signals (e.g. demodulation reference signals) for these UEs. The multiple reference signals allocated for the same time-frequency resources may use the same base sequence and different cyclic shifts, or use the same base sequence and different orthogonal cover codes, or use the same root sequence and different combing structures, or a combination of the above three situations, or different root sequences.

Since the number of UEs sharing the same time-frequency resources is relatively less, the allocated multiple reference signals may be taken as the UE identification information for the UEs sharing the time-frequency resources. The base station finds the data transmission on the time-frequency resources used for grant-free transmission through detecting the reference signals. If the base station successfully detects the data of one or more UEs via the detection of the reference signals, and the data of one or more UEs indicates that there are more data to be transmitted, the base station allocates dedicated time-frequency resources for each UE, transmits the allocated result to the UE via uplink grant and uplink time-frequency resource allocation manner, for subsequent data transmission. If the base station detects the transmission of the reference signals but fails to detect the user data, since the UE identifier can be determined according to the reference signals and the time-frequency resources, the UE which is currently transmitting uplink data can be determined according to the detected reference signals. Dedicated time-frequency resources may be allocated to the UE, or uplink grant or ACK/NACK and uplink time-frequency resource allocation manner may be transmitted to the corresponding UE for the retransmission of the failed data.

In order to reach a balance between the delay, cost and reliability, the bandwidth for first grant-free transmission may be relatively small, and the bandwidth for the subsequent data transmission may be large. Therefore, even if the resource allocation for the first grant-free transmission ensures no conflict between the grant-free transmissions, it does not lead to much waste. Meanwhile, the allocation of the dedicated resources ensures that the subsequent transmission has no conflict, and the subsequent transmission may also be performed in a grant-free transmission mode, which not only improves the reliability of the transmission, but also reduces the transmission delay compared with the schedule-based transmission.

In embodiments of the present disclosure, the first grant-free transmission adopts a manner similar as semi-persistent scheduling, e.g., the base station allocates resources for grant-free transmission for the UE in advance. The UE does not need to wait for grant information of the base station before transmitting data. The grant-free transmission mode is applicable for a UE which is in a connected mode, has finished a random access procedure and has been allocated with a UE ID (e.g. C-RNTI in LTE) by the base station. At this time, the base station is able to implement resource allocation, releasing and reallocation on the downlink control channel, the downlink shared channel, the broadcast channel or the higher layer signaling according to the UE ID information.

When the UE does not perform a random access, but performs only downlink synchronization and obtains system information on the broadcast channel and downlink control channel, the above procedure needs to be modified as follows.

Firstly, since the base station does not have UE information and does not allocate UE ID information for the UE, the base station cannot allocate corresponding uplink data transmission resources for each UE. At this time, the grant-free transmission is implemented via a manner in which a resource pool is defined and each UE randomly selects resources from the resource pool. The base station configures available resource pool via the broadcast channel, the downlink control channel or the higher layer signaling, wherein the resource pool includes time-frequency resources, available multiple access signatures and available uplink demodulation reference signals used for the grant-free transmission.

When the UE needs to transmit uplink data, the UE randomly selects available resources with equal probability and implements uplink data transmission.

If the base station correctly detects the uplink data transmitted by the UE and finds that the UE transmitting the uplink data has more data to be transmitted according to the dedicated resource request indication, the base station transmits ACK information on a corresponding feedback channel and allocates dedicated resources for the UE transmitting the uplink data, including time-frequency resources and/or multiple access resource and/or uplink demodulation reference signals, and indicate the dedicated resources to the UE through the downlink control channel, the downlink shared channel, the broadcast channel or the higher layer signaling channel. Since the UE is not allocated with the UE ID, the UE ID information is denoted by the features of the time-frequency resources and/or multiple access signatures and/or uplink demodulation reference signals on which the uplink data is successfully transmitted, to indicate to the UE which uses the particular resources for the first time grant-free transmission, the dedicated resource allocation information for the subsequent transmission.

After transmitting the uplink data, the UE detects on the feedback channel according to predefined timing or according to an indicator in the downlink control channel. If NACK signal is detected on the feedback channel, the UE retransmits the data or perform a new transmission. If ACK signal is detected, the UE detects dedicated resource allocation information for the uplink transmission in the downlink control channel, the downlink shared channel, the broadcast channel or the higher layer signaling according to the resources used by the uplink data transmission, and transmits subsequent uplink data according to the detected dedicated resource allocation information. It should be noted that, since the UE still not finish the random access procedure yet, when transmitting the subsequent uplink data, the UE still uses the grant-free transmission mode, and does not need to wait for the scheduling information and uplink grant information from the base station.

Similar as the foregoing procedure, when the UE finishes the transmission of the remaining data and has no additional uplink data to be transmitted via the dedicated resources, the UE indicates a subsequent data transmission indication to the base station. If the base station detects the subsequent data transmission indicator and finds that the UE has no more data to be transmitted, the base station transmits ACK in the corresponding feedback channel, and releases the dedicated channel. When the UE needs to transmit data again, the UE selects, with equal probability, a resource from the resource pool for the uplink data transmission.

The above procedure is as shown in FIG. 10.

In FIG. 10, for the first grant-free transmission, the UE selects resources with equal probability from the resource pool. If the first transmission succeeds, the UE implements transmission of subsequent data using the dedicated resources allocated by the base station. After the transmission is completed, the base station releases the resources. The UE randomly uses the resources in the resource pool for future data transmission again.

Compared with the UE in the connected mode and the grant-free transmission similar as the semi-persistent scheduling manner, the difference relies in that, after successfully detecting the first grant-free transmission data of the UE, the base station does not need to release the resources used by the UE. After the UE finishes the transmission of all data, the base station does not need to allocate resources for a next first grant-free transmission for the UE. In the whole procedure, since the base station does not allocate UE ID information for the UE, the criteria for allocating the dedicated resources is based on the resources on which data is successfully transmitted during the first grant-free transmission, including information of time-frequency resources, multiple access signatures and uplink demodulation reference signals (i.e., distinguish UEs using character values of resources used by the UEs for the first uplink data transmission).

If the UE is in the connected mode and has finished the random access procedure, but still randomly selects resources from the resource pool for the uplink grant-free transmission, the data transmission, and resource configuration and release are similar as that shown in FIG. 10. The difference is that, since the base station allocates UE ID information for the UE, when allocating dedicated resources for the UE, the base station indicates allocation information to the UE using the dedicated downlink control channel, downlink shared channel or higher signaling.

It should be noted that, when indicating to the UE the dedicated resource allocation information, the base station may further transmit a Modulation and Coding Scheme (MCS) required for the uplink data transmission. During the first time grant-free transmission, the UE uses a predefined MCS. If the first time transmission of the UE succeeds, the base station may estimate a channel quality of the uplink data channel according to a uplink demodulation reference signal or a Sounding Reference Signal (SRS) inserted in the uplink data, determine the MCS required for subsequent data transmission of the UE, and notifies the UE of the determined MCS together with the resource allocation information via the broadcast channel, the downlink control channel, the downlink shared channel or the higher layer signaling.

At the same time, when transmitting data using the dedicated resources, the UE may dynamically adjust the MCS required for the uplink data transmission. Since the subsequent data of the UE is transmitted using the dedicated resources, i.e. the same frequency band is used, the MCS estimated at this time may be more accurate than that estimated during the first time grant-free transmission. The base station estimates the uplink channel quality according to the uplink demodulation reference signal or sounding reference signal inserted in the uplink data, determines the MCS to be used by the uplink data transmission, and notifies the UE using the corresponding resources of the change of the MCS via the downlink control channel, the downlink shared channel, the broadcast channel or the higher layer signaling. The changing manner of the MCS may be negotiated between the base station and the UE. In one embodiment, after the base station notifies the UE of the change of the MCS, the UE starts to use the new MCS after k-th slots, wherein k is a change interval known by the base station and the UE.

Embodiment 2

In this embodiment, a solution for dealing with collision via a mode switching manner is described.

Suppose that the grant-free transmission operates similarly as the semi-persistent scheduling, i.e., the base station allocates resources for grant-free transmission for the UE in advance, the UE does not need to wait for the grant information of the base station before transmitting data. The base station allocates the same time-frequency resources and/or multiple access signatures and/or uplink demodulation reference signals to different UEs, and allocates different token bits for these UEs at the same time to distinguish the multiple UEs allocated with the same resources.

In order to increase the system spectrum efficiency and the number of access UEs, the base station may allocate the same resources to different UEs. At this time, there may be collision when the UEs allocated with the same resources transmit uplink data, which may affect the performance. The collision procedure is described with reference to FIG. 11.

In FIG. 11, UE 1 and UE 2 are allocated with the same resources. If UE 1 and UE 2 transmit uplink data in different slots, there is no collision between UE 1 and UE 2, and their respective data can be corrected detected and decoded. If UE 1 and UE 2 transmit uplink data in the same slot, there may be collision between their uplink data. Since they use the same uplink demodulation reference signals, the base station is able to recognize at most one channel, and therefore is able to decode the uplink data of at most one UE. In most cases, the base station cannot decode effective data and is only able to find that there is signal transmission on the resources based on detection of the uplink demodulation reference signals.

Although collision of retransmission data can be avoided to some extent via a random backoff mechanism, when the system serves a large number of UEs, even if the random backoff mechanism is adopted, continuous collisions may still happen with a high probability. At this time, other operations and processing may be performed to increase the system reliability and effectiveness.

In view of the foregoing, embodiments of the present disclosure describe a solution for solving the continuous collision problem through allocating reserved resources. The method is described in the following.

First, the base station allocates resources for grant-free transmission for a UE which transmits data in the grant-free mode, including time-frequency resources, multiple access signatures and/or uplink demodulation reference signals. If the same resources are allocated to different UEs, the base station allocates different token bits to the UEs allocated with the same resources. Suppose that the number of UEs allocated with the same resources is N_u. The base station provides the resource allocation information and the token bits to the UE via a broadcast channel, a downlink control channel, a downlink shared channel or higher layer signaling.

When the UE needs to transmit uplink data in the grant-free mode, the UE transmits the uplink data in the grant-free mode using the allocated resources.

The base station determines according to DMRS whether there is uplink data transmission from a UE using corresponding time-frequency resources and/or physical resources, and performs data detection and decoding. If uplink data is successfully decoded, the base station transmits ACK information on a corresponding feedback channel. If the uplink data is not successfully detected, the base station transmits NACK information on the corresponding feedback channel, or does not transmit feedback information.

If the UE receives the NACK information on the corresponding feedback channel or does not receive any feedback information on the corresponding feedback channel, the UE transmits retransmission information according to a predefined rule. Suppose that the maximum retransmission number is N_m, or a dropping time is t_m. The base station counts the number of retransmission times, or counts the time since first time receiving the packet which is not successfully received, if the number of retransmission times is larger than N_m, or the counted time exceeds t_m, the base station allocates reserved resources for the UE, and provides reserved resource allocation information to the UE via the broadcast channel, the downlink control channel, the downlink shared channel or the higher layer signaling. During a predefined time period, if the reserved resources are not used by the UE, the reserved resources are released.

Since the base station cannot determine the collision happens between which UEs, in order to distinguish the UEs allocated with the same resources, the base station allocates multiple resources for the UEs allocated with the same resources (i.e. allocate corresponding dedicated resources for the UEs). For example, for OFDM, the multiple resources include multiple orthogonal time-frequency resources. FIG. 12 shows a resource allocation manner for the OFDM according to some embodiments of the present disclosure.

In FIG. 12, the base station allocates the same resources for 4 UEs. Therefore, 2 bits token bits are required to distinguish the 4 UEs allocated with the same resources. When allocating resources for the UEs using the same resources, the base station allocates orthogonal time-frequency resources for the 4 UEs for subsequent transmission. The orthogonal resources of the 4 UEs are associated with each other, i.e., only one reserved resource index is provided to the UEs. The reserved resource index acts as a reference index for the reserved resources. For example, the position of merely one time-frequency resource is provided, and the index of this reserved resource is taken as the time-frequency resource reference position. The time-frequency resources allocated to the UEs may be determined according to the token bits of the UEs. In one embodiment, it is defined that each UE is allocated with the same bandwidth. Only the time-frequency resource of the UE with token 0 is indicated. Other UEs determine the time-frequency resources allocated by the base station for them according to the bandwidth and the token bits. This procedure is shown in FIG. 13.

In FIG. 13, the uplink data transmitted by UEs allocated with token 0 and 2 collides, and the number of retransmission times exceeds the maximum retransmission number or the retransmission time exceeds the dropping time, reserved resources are allocated to the UEs which are allocated with the same resources and different token bits, and the UEs are provided with the allocation information via the broadcast channel, the downlink control channel, the downlink shared channel or the higher layer signaling. After receiving the reserved resource allocation information, each UE determines the time-frequency resources allocated to it according to the bandwidth and the token bits, and retransmits uplink data using the time-frequency resources.

The base station performs DMRS detection on each of the reserved resources. If DMRS is detected on the time-frequency resources allocated to a token and the data is successfully decoded, ACK information is transmitted on a corresponding feedback channel, and the time-frequency resources are reserved for the UE for subsequent data transmission. If DRMS is detected on the time-frequency resources allocated to a token but the data cannot be successfully decoded, NACK information is transmitted on the corresponding feedback channel to notify the UE to retransmit data using the time-frequency resources. If no DMRS is detected on the time-frequency resources allocated to a token, no ACK/NACK information is transmitted and the resources are released. When OFDMA is adopted for the above token-based resource allocation, the time-frequency resources are the OFDMA multiple access signatures. The base station merely needs to indicate the time-frequency resource reference position to the UE. Since the UE operates on orthogonal time-frequency resources, there is no collision between the uplink demodulation reference signals. Therefore, the uplink demodulation reference signals may be configured according to a predefined manner.

It should be noted that, as to other orthogonal or non-orthogonal multiple access solutions, the token-based resource allocation manner as shown in FIG. 13 is also applicable. In particular, for the code division orthogonal access manner, when resources are allocated based on token bits, a parent code of respective code resource is indicated to the UE. Each UE generates their respective orthogonal spread code according to the token bits and the parent code. In one embodiment, a Zadoff-Chu sequence is taken as a parent code. The orthogonal spread code of each UE is generated via a cyclic shift of the parent code. The number of shifted bits of the cyclic shift is determined according to the token, and is indicated to the UE via the broadcast channel, the downlink control channel, the downlink shared channel or higher layer signaling.

When non-orthogonal multiple access manner is adopted, the token-based resource allocation may be implemented through generating a child code or a child codebook via the parent code. In another resource allocation manner, one or more codebook groups are defined and are indicated to the UEs via the broadcast channel, the downlink control channel, the downlink shared channel or higher layer signaling. Each UE selects a corresponding codebook group according to its token bit. This procedure is shown in FIG. 14.

In FIG. 14, one codebook group includes four codebooks, and each codebook corresponds to one token bit. When allocating the dedicated resources, the base station indicates a codebook group index to each UE via the broadcast channel, the downlink control channel, the downlink shared channel or higher layer signaling. The UE determines the codebook according to the codebook group index and the token bit. The codebook includes: a codeword matrix, an interleave sequence, etc.

It should be noted that, in the multiple access manner not based on OFDMA described above, it is further necessary to indicate the time-frequency resources available for the UE to the UE together with the allocated codebook. In addition, it should be noted that, the multiple UEs share the same time-frequency resources and are distinguished via different multiple access signatures and/or uplink reference signals.

The uplink demodulation reference sequence of each UE is determined according to a cyclic shift of a parent sequence, wherein the cyclic shift is determined by the token bits.

In this manner, in order to indicate the allocation of the dedicated resources, the base station needs to indicate the allocated physical time-frequency resources, the dedicated multiple access signatures, and the parent sequence of the uplink demodulation reference signals.

After obtaining the dedicated resources, the UE transmits data on the dedicated resources. The uplink data transmission may be implemented in the schedule-based mode, i.e., transmitting a scheduling request before each data transmission, and transmitting data after receiving a grant from the base station. Or, a grant-free mode may be adopted, i.e., the UE directly transmits data on the allocated resources after finishing data processing.

The base station detects activated uplink demodulation reference signals and multiple access signatures on the time-frequency resources, and allocates other non-activated uplink demodulation reference signals and the corresponding multiple access signatures to other UEs.

After the UE finishes the transmission of all uplink data, the UE indicates to the base station that all data have been transmitted via a subsequent data transmission indicator similar as embodiment 1.

The base station detects the uplink data transmitted by the UE, and transmits ACK/NACK information on the corresponding feedback channel. If the base station finds that subsequent data transmission indicator carried in the uplink data or uplink control channel indicates that there is no more data to be transmitted, the base station releases the corresponding resources.

The solution provided by this embodiment is able to improve UE access possibility and data transmission reliability when the network load is heavy. Thus, the system overall performance is improved.

Embodiment 3

In this embodiment, a mode switching solution for switching between the schedule-based uplink transmission and the grant-free uplink transmission based on network load by the base station is described.

Suppose that the system divides the available time-frequency resources into time-frequency resources for schedule-based transmission and time-frequency resources for grant-free transmission, as shown in FIG. 6. The resource allocation manner is indicated to UEs in a cell via a broadcast channel, a downlink control channel or a downlink shared channel in form of system information, or is indicated to the UEs via higher layer signaling. As to the grant-free transmission, the base station configures a resource pool or configures time-frequency resources and/or multiple access signatures and/or uplink demodulation reference signals for respective UE. The UE selects the schedule-based transmission mode or the grant-free transmission mode according to a service type and a corresponding data transmission requirement. The data transmission requirement includes: delay requirement and reliability requirement.

The base station detects a network status and allocates the resources for the grant-free transmission. In one manner, the base station detects load of UEs in grant-free transmission mode, or detects or collects statistics of signal-to-noise ratios of uplink data transmitted by the UEs in the grant-free transmission mode, or detects and collects statistics of numbers of retransmission times of the UEs in the grant-free transmission mode. If the base station determines that the load of the UEs in the grant-free transmission mode is higher than a predefined first threshold, or the average signal-to-noise ratio of the uplink data of the UEs in the grant-free transmission mode is lower than a predefined second threshold, or the average number of retransmission times of the UEs in the grant-free transmission mode is higher than a predefined third threshold, it indicates that there is a heavy load on the resources for the grant-free transmission, or a transmission environment of a grant-free transmission channel is poor, more time-frequency resources, multiple access signatures and uplink demodulation reference signals need to be allocated to improve the transmission environment for the grant-free transmission.

Meanwhile, the base station detects the load of the UEs in schedule-based transmission mode, or detects and collects statistics of an average scheduling delay of the UEs in the schedule-based transmission mode, i.e., the average time from the UE initiating a scheduling request until the UE finishing the data transmission. If the base station determines that the load of the UEs in the schedule-based transmission mode is higher than a predefined fourth threshold, or the average transmission delay of the UEs in the schedule-based transmission mode is larger than a predefined fifth threshold, it indicates that the resources for the schedule-based transmission has a heavy load or a poor transmission environment. It is required to allocate more time-frequency resources, multiple access signatures and uplink demodulation reference signals to improve the transmission environment for the schedule-based transmission.

The base station reallocates the resources used for the schedule-based transmission and the resources used for the grant-free transmission based on the detected result, and transmits allocation information of time-frequency resources, multiple access signatures and uplink demodulation reference signals allocated to the grant-free transmission to the UEs in the cell via a broadcast channel, a downlink control channel, a downlink shared channel or higher layer signaling configuration. A possible allocation manner is as follows.

If the load of the grant-free transmission is heavy, but the load of the schedule-based transmission is relatively light, the base station may adjust the load via any one of the following.

1. The base station expands the existing resource pool. For example, the time-frequency resources allocated to the grant-free transmission may be increased, and more multiple access signatures and uplink demodulation reference signals may be allocated for the grant-free transmission.

2. The base station configures a new resource pool for the grant-free transmission. For example, the base station may directly allocate new time-frequency resources for the grant-free transmission, and allocates multiple access signatures and uplink demodulation reference signals used on these time-frequency resources.

The above two manners are shown in FIG. 15.

In FIG. 15, the original grant-free transmission resources cannot support the current load, and the load of the grant-free transmission is heavy, which affects the link performance of the UEs in the grant-free transmission mode. FIG. 15 shows the above two manners to increase resources for the grant-free transmission. In one manner, the previous grant-free transmission resources are directly expanded, in the other manner, new grant-free transmission resources are allocated directly.

Since the above manners may occupy the data transmission resources for the schedule-based transmission, there may be impact to the schedule-based transmission. When increasing the grant-free transmission resources, the amount of the increased resources is determined according to the load and the signal-to-noise ratio of the grant-fee transmission. One possible manner is as shown in Table 1.

TABLE 1 possible grant-free resource expanding manner

| condition | Expanding manner |
|---|---|
| load of grant-free transmission < threshold 1 & Signal-to-noise ratio < threshold 2 | original grant-free resources: expanding to resource 1 |
| load of grant-free transmission < threshold 1 & threshold 2< Signal-to-noise ratio < threshold 3 | original grant-free resources: expanding to resource 2 |
| threshold 1< load of grant-free transmission < threshold 4 & threshold 2< Signal-to-noise ratio < threshold 3 | original grant-free resources: expanding to resource 3 |
| Signal-to-noise ratio > threshold 3 | original grant-free resources: expanding to resource 3 and adding new grant-free resources |

In Table 1, resource 1 denotes adding time-frequency resources, multiple access signatures and the corresponding uplink demodulation reference signals to the original grant-free resources. Resource 2 denotes continuing to add time-frequency resources, multiple access signatures and the corresponding uplink demodulation reference signals based on the resource 1. Resource 3 denotes continuing to add time-frequency resources, multiple access signatures and the corresponding uplink demodulation reference signals based on the resource 2. The new grant-free resource denotes additionally allocated resources for the grant-free transmission based on the current grant-free resources (including the expanded grant-free resources).

If the load on the grant-free resources is not increased apparently, but the signal-to-noise ratio of the UE in the grant-free transmission mode is decreased and is lower than a predefined threshold, or the load of the grant-free resources is increased apparently and is higher than a predefined threshold and it leads to apparent decrease of the signal-to-noise ratio of the UE in the grant-free transmission mode, some UEs may be indicated via control signaling configuration to switch to the schedule-based transmission mode.

In particular, a receiving threshold may be configured for the UE to select the grant-free transmission mode or the schedule-based transmission mode. The threshold may include: Reference Signal Received Power (RSRP) threshold of the downlink reference signals, path loss threshold from the base station to the UE measured by the UE, etc. The threshold may be indicated to the UE via the downlink control channel, the downlink shared channel, the broadcast channel or the higher layer signaling. The UE determines whether to adopt the grant-free transmission mode according to a service type, and compares the measured RSRP or path loss with the above threshold. If the RSRP is lower than the predefined RSRP threshold, or the pass loss is higher than the predefined pass loss threshold, it indicates that the receiving signal-to-noise ratio is low and the schedule-based transmission mode should be adopted; otherwise, the grant-free transmission mode is adopted.

The RSRP threshold and the pass loss threshold may be dynamically adjusted according to the load and the channel status. For example, if the load of the grant-free transmission is light and is lower than a threshold, and the signal-to-noise ratio of the UE in the grant-free transmission mode is high and is higher than a threshold, a relatively low RSRP threshold or a relatively high path loss threshold may be configured to let more UEs operate in the grant-free mode. If the grant-free transmission load is heavy and is higher than a threshold, and the signal-to-noise ratio of the UE in the grant-free transmission mode is low, a relatively high RSRP threshold or a relatively low path loss threshold may be configured to make less UEs operate in the grant-free transmission mode. Through adjusting the thresholds, it is possible to adjust the number of UEs operating in the grant-free transmission mode and the number of UEs operating in the schedule-based transmission mode, so as to adjust the load of the two modes and adjust the signal-to-noise ratio.

If the schedule-based transmission mode has a heavy load, whereas the grant-free transmission mode has a light load, the grant-free transmission resources may be wasted. The time-frequency resources allocated to the grant-free transmission may be reduced to decrease the load of the schedule-based transmission mode.

Embodiment 4

In this embodiment, a procedure for re-allocating grant-free transmission resources for a UE which has been allocated with dedicated time-frequency resources is described with reference to a detailed system.

Suppose that the system divides available time-frequency resources into time-frequency resources used for schedule-based transmission and time-frequency resources used for grant-free transmission, as shown in FIG. 6. The resource allocation manner is informed to respective UE in the cell via a broadcast channel, a downlink control channel or a downlink shared channel in form of system information, or via higher layer signaling configuration. For the grant-free transmission, the base station configures time-frequency resources and/or multiple access signatures and/or uplink demodulation reference signals for the UE.

After transmitting data on the resources allocated for the grant-free transmission, the UE waits for HARQ feedback information from the base station. According to the foregoing embodiments, if the base station successfully detects the data transmitted by the UE, the base station transmits an ACK signal and an uplink grant, to trigger and indicate the time-frequency resources for subsequent data transmission.

Considering the resource utilization ratio of the grant-free transmission resources, one possible operating manner is as follows: after receiving the uplink grant, the UE does not use the grant-free transmission resources (including time-frequency resources, DMRS, etc.) allocated by the base station in the semi-persistent manner any longer. The UE transmits the remaining data according the uplink grant, and a subsequent HARQ instruction or a subsequent uplink grant.

After the UE finishes the transmission of the remaining data, the base station needs to allocate resources for grant-free transmission again. The following shows several possible manners.

a. The UE carries a buffer status report in the data when transmitting the data, to inform the base station whether the UE has more data to be transmitted and the amount of the remaining data, so as to facilitate the base station to allocate uplink resources (including time-frequency resources, DMRS, MCS, etc.) for the transmission of the remaining data. If the transmission of the data is completed (i.e., the buffer of the current service is 0 after the current transmission), information indicating that BSR is 0 may be carried.

The base station receives and detects the uplink data. If the uplink data is successfully detected, after the data containing BSR=0 is received, it is required to allocate resources for grant-free transmission for the UE again. In one possible manner, after successfully receiving the data, the base station transmits an uplink grant for indicating ACK (or transmitting ACK and uplink grant), wherein a time-frequency resource indicator in the uplink grant indicates the resources allocated for the grant-free transmission. Indication and informing of the resources for the grant-free transmission may be implemented via any one of the following.

a.1. After the UE transmits the data containing BSR=0, if the UE receives the uplink grant indicating an ACK or receives both the ACK and the uplink grant, the UE determines that the data is successfully transmitted, and determines that the uplink time-frequency resource configuration in the uplink grant is a configuration command for the grant-free transmission.

a.2. After the UE transmits the data containing the BSR=0, if the UE receives the uplink grant indicating an ACK or receives both the ACK and the uplink grant, the UE determines that the data is successfully transmitted. Meanwhile, if the time-frequency resource information in the uplink grant overlaps with the time-frequency resources used for the previous grant-free transmission, the UE determines that the uplink grant is a configuration command for configuring the grant-free transmission.

In another method for facilitating the base station to determine whether the data transmission is completed, a timer is configured for determining whether the UE has more data to be transmitted. The base station starts the timer after receiving the data transmitted on the scheduled uplink resources. If the base station does not receive any new uplink data until the timer expires, the base station determines that the uplink transmission is completed and configures corresponding resources for grant-free transmission (including time-frequency resources, DMRS and MCS, etc.) for the UE via the downlink control channel or higher layer signaling. Alternatively, the base station starts the timer after transmitting an ACK/NACK or an uplink grant. If the base station does not receive any new uplink data until the timer expires, the base station determines that the uplink transmission of the UE is completed.

Accordingly, after the UE finishes the transmission of all data, the UE monitors the downlink control channel or relevant higher layer signaling configuration, and reads resources scheduling information for the grant-free transmission of the UE, for use of data transmission of a service to be transmitted in the grant-free transmission mode. Considering that the UE may fail to receive the ACK/NACK signal fed back by the base station, the timeout value of the timer may be longer than the delay from the UE transmitting the data to the UE receiving the ACK/NACK.

If the base station configures the grant-free transmission mechanism for retransmission, i.e., configures the number of retransmission times K, if the UE does not receive the feedback information of the base station, and the number of transmission times of the uplink data is smaller than K, the UE retransmits the uplink data. At this time, the timer may be started after the UE finishes the K times of data transmissions. If the base station does not receive the uplink data transmitted by the UE until the timer expires, the base station determines that the UE successfully receives the feedback of the base station and does not have more data to be transmitted. The base station configures corresponding resources for grant-free transmission (time-frequency resources, DMRS and MCS, etc.) via the downlink control channel or the higher layer signaling. Alternatively, the timer is started when the UE transmits the data. When the timer expires, it is determined that the data of the UE is successfully transmitted and there is no more data to be transmitted. The base station configures time-frequency resources for grant-free transmission of the UE.

When allocating the time-frequency resources for the grant-free transmission, the base station may allocate the time-frequency resources via the downlink control channel. In one possible manner, a new downlink control information (DCI) format may be defined, so as to indicate the time-frequency resources for the grant-free transmission. This DCI format has a length different from other DCI formats, or has the same length with other DCI formats but with different contents. The DCI format for allocating time-frequency resources for the grant-free transmission may include at least the following:

time-frequency resource allocation information;
DMRS configuration information;
MCS information; and
periodicity information of semi-persistently configured time-frequency resources;

wherein the DMRS configuration information includes cyclic shift information, orthogonal cover code information and combing structure information. The DMRS configuration information may further include characteristic information for distinguishing the DMRSs used by different UEs.

Besides the above manner, it is also possible to reuse the current DCI format. For example, a particular parameter in the current DCI format may be configured to be 0, to indicate that this DCI format is used as the resource allocation information for the grant-free transmission. When the current DCI format is reused, a simple example is as follows: an information field (the number of bits may be 1 or an integer not smaller than 1) in the current DCI format is reused to indicate whether the DCI is used for the resource allocation of the grant-free transmission. If the information field indicates that the DCI format is used for the resource allocation of the grant-free transmission, the DCI format includes at least:

time-frequency resource allocation information;
DMRS configuration information;
MCS information; and
periodicity information of persistently configured time-frequency resources.

If the above manner is adopted to configure resources, operations at the UE may be as follows:

After finishing a last retransmission or data transmission, the UE detects on a corresponding downlink control channel. If the DCI information carried in the downlink control channel indicates that the DCI format is used for the resource allocation information of the grant-free transmission, the UE implements grant-free transmission according to the resource allocation information.

In the above manner, the schedule-based transmission is switched to the grant-free transmission based on ACK+ uplink grant. It should be noted that, the switching from the schedule-based transmission to the grant-free transmission may also be implemented based on merely the uplink grant. In one possible method, the UE determines according to the DCI format or the information in the DCI format whether a last schedule-based data transmission succeeds. After finishing the data transmission, the UE detects on the downlink control channel after a fixed or a configured timing. If detecting the downlink control information transmitted to the UE, and determining through reading the DCI format that the DCI format is used for the resource allocation information of the grant-free transmission, or the grant-free transmission indicator in the DCI format indicates that the DCI format is used for the resource allocation information of the grant-free transmission, the UE determines that the current data transmission succeeds, and the DCI indicates the resource allocation information for a next grant-free transmission. When the UE needs to transmits data in the grant-free transmission mode during a subsequent service transmission, the UE transmits on the grant-free transmission resources configured by the resource allocation information in the DCI. If the UE determines that the DCI is not the DCI format used for the grant-free transmission, or the contents of the DCI is not used for the resource allocation of the grant-free transmission (e.g., a corresponding indicator in the DCI indicates that the DCI format is used for uplink resource allocation), it indicates that the current data transmission is failed. The UE transmits retransmission data on the uplink resources indicated by the DCI. It should be noted that, the UE adopts the C-RNTI allocated by the base station when detecting the DCI.

In another manner, the switching from the schedule-based transmission to the grant-free transmission may be performed based on a group DCI. In particular, a DCI is predefined and is scrambled via RRC signaling or semi-persistent scheduling radio-network-temporary-identity (SPS-RNTI) configured by higher layer signaling, to be used for the allocation of grant-free resources of a group of UEs. The UE detects DCI scrambled by C-RNTI and DCI scrambled by SPS-RNTI at the same time. If the DCI scrambled by SPS-RNTI is detected, it is determined that the last data transmission succeeds, and the resource allocation in the DCI is used for the grant-free transmission. If the DCI scrambled by the C-RNTI is detected, the last data transmission is not correct, and the resource allocation in the DCI is used for retransmission.

It should be noted that, if this manner is adopted, the SPS-RNTI may be replaced by another RNTI defined by the base station, e.g., adopt a grant-free-RNTI allocated and defined by the base station to identify and scramble the DCI.

In the above manner, it is assumed that the grant-free transmission and the schedule-based transmission adopt the same HARQ procedure. In other embodiments, the grant-free transmission and the schedule-based transmission may adopt different HARQ procedures. For example, when transmitting grant-free data, the UE adopts an HARQ procedure for the grant-free transmission. After the grant-free transmission is finished, the UE waits for feedback information of the base station. If ACK/NACK+uplink grant or uplink grant is received, subsequent data transmission (in case that ACK is received) or retransmission (in case that NACK is received) may be performed based on the information in the uplink grant, and a new HARQ procedure for the schedule-based transmission may be utilized, the buffer of the HARQ procedure for the grant-free transmission is cleared. The HARQ procedure for the grant-free transmission may be used for a new grant-free transmission.

For the new schedule-based HARQ procedure, the buffer of the grant-free HARQ procedure may be directly copied or used. If transmission of schedule-based data is completed during the new HARQ procedure, the HARQ procedure is released, which has no impact on the HARQ procedure of the grant-free transmission.

In accordance with the above method, some embodiments of the present disclosure provide a UE. The structure of the UE is as shown in FIG. 16, including: a transmitting module, a resource requesting module and a receiving module; wherein the transmitting module is to receive resource allocation information for grant-free transmission from a base station, when there is data to be transmitted in a grant-free transmission mode, transmit uplink data on the grant-free transmission resources according to the resource allocation information;

the resource requesting module is to transmit a dedicated resource request indicator to the base station when the transmission of the uplink data cannot be completed within a predefined number of uplink transmissions;

the receiving module is to receive dedicated resource allocation information from the base station; and the transmitting module is further to transmit subsequent uplink data on the dedicated resources corresponding to the dedicated resource allocation information.

In some embodiments, the transmitting module is further to indicate data transmission completion to the base station in a last uplink data transmission via a data transmission completion indicator.

In accordance with the above methods, embodiments of the present disclosure provide a base station. The structure of the base station is as shown in FIG. 17, including: a receiving module, a resource allocating module and a transmitting module; wherein the receiving module is to transmit resource allocation information for grant-free transmission, and the receiving module is to receive uplink data transmission transmitted by a UE on grant-free transmission resources;

if a dedicated resource request indicator is received from the UE, the resource allocating module is to allocate dedicated resource for the UE and indicate dedicated resource allocation information to the UE; and the receiving module is further to receive subsequent uplink data transmitted by the UE on the dedicated resources.

In some embodiments, when receiving a data transmission completion indicator from the UE, the base station releases the dedicated resources.

FIG. 18 is a flowchart for operation of the UE according to various embodiments of the present disclosure.

Referring to FIG. 18, in step 1801, the UE receive resource allocation information for a grant-free transmission from a base station. In step 1803, the UE transmits uplink data using grant-free transmission resources according to the resource allocation information to the base station.

In step 1805, the UE, if the transmission of the uplink data cannot be completed within a predefined number of uplink data transmissions, transmits a dedicated resource request indicator to the base station. In some embodiments, if the UE is in a connected mode and has finished a random access procedure, the UE receives grant-free resource allocation indication transmitted by the base station via system information, a higher layer signaling or a control channel or receives an available resource pool configured by the base station via system information, a higher layer signaling or a control channel. The resource pool includes the grant-free transmission resources. The dedicated resource information is identified by the UE identification information.

In some embodiment, the UE, if receiving the grant-free resource allocation indicator from the base station, receives token bits corresponding to the UE from the base station. After transmitting the uplink data on the dedicated resources, the UE detects reserved resource allocation information, determines the reserved resources allocated from the UE by the base station according to the detected reserved resource allocation information and the token bits corresponding to the UE, and transmits data on the reserved resources.

In some embodiments, the UE counts a number of retransmission times, if the number of retransmission times exceeds a maximum retransmission number, detects the reserved resource allocation information according to information of the resources used by a last data transmission or if an acknowledgement (ACK) is not received from the base station before a predefined dropping time expires, detects the reserved resource allocation information according to information of the resources used for a last uplink data transmission or detects the reserved resource allocation information according to information of the resources used for a last uplink data transmission.

In some embodiments, if the UE is in a non-connected mode, the UE receives an available resource pool configured by the base station via system information, a higher layer signaling or a control channel. The resource pool includes the grant-free transmission resources. The dedicated resource information is identified by information of resources used by the UE during a last uplink data transmission.

In step 1807, the UE receives dedicated resource allocation information from the base station. In step 1809, the UE transmits subsequent uplink data on dedicated resources corresponding to the dedicated resource allocation information to the base station. In some embodiment, the UE indicates, to the base station, data transmission completion in a last uplink data transmission via a data transmission completion indicator.

FIG. 19 is a flowchart for operation of a base station according to various embodiments of the present disclosure.

Referring to FIG. 19, in step 1901, the base station transmits resource allocation information for grant-free transmission. In some embodiment, the base station allocates the grant-free transmission resources for the UE and transmits the resource allocation information for the grant-free transmission to the UE via system information, a higher layer signaling or a control channel or configures an available resource pool via system information, a higher layer signaling or a control channel. The available resource pool includes the grant-free transmission resources.

In step 1903, the base station receives uplink data from a UE on grant-free transmission resources. In step 1905, if a dedicate resource request indicator is received from the UE, the base station allocates dedicated resources for the UE and indicates dedicated resource allocation information to the UE.

In some embodiment, the base station allocates the same grant-free transmission resources for different UEs and allocates different token bits for the different UEs to distinguish the different UEs. The base station counts a number of retransmission times of the UE on the grant-free transmission resources, if the number of retransmission times exceeds a predefined maximum retransmission number, transmits reserved resource allocation information to the UE allocated with the grant-free transmission resources, or counts time from the time that a data packet is received on the grant-free transmission resources but is failed to be decoded, if the counted time exceeds a dropping time, transmits reserved resource allocation information to the UE allocated with the grant-free transmission resources. In some embodiment, the base station indicates a reserved resource reference index to the UE. Reserved resources allocated for the UE are determined according to the reserved resource reference index and token bits of the UE. In some embodiments, within a predefined time period, if the reserved resources are not used by the UE, the base station releases the reserved resources.

In some embodiments, the base station identifies the UE by the UE identification information or identifies the UE according to information of resources used by the UE during a last uplink data transmission. In some embodiment, the base station divides available resources into schedule-based transmission resources and grant-free transmission resources. The base station detects a network status. The base station reallocates the schedule-based transmission resources and the grant-free transmission resources according to a measurement result. In some embodiments, the base station detects load of UEs in the grant-free transmission mode, if the load of the UEs in the grant-free transmission mode is higher than a pre-defined first threshold, determines to add the grant-free transmission resources. The base station detects and collects statistics of signal-to-noise ratios of uplink data transmitted by UEs in the grant-free transmission mode, if an average signal-to-noise ratio of the uplink data of the UEs is lower than a pre-defined second threshold, determines to add the grant-free transmission resources. The base station detects and collects statistics of numbers of retransmission times of UEs in the grant-free transmission mode, if an average number of retransmission times of the UEs in the grant-free transmission mode is higher than a pre-defined third threshold, determines to add the grant-free transmission resources. The base station detects load of UEs in the schedule-based transmission mode, if the load of the UEs in the schedule-based mode is higher than a pre-defined fourth threshold, determines to add the schedule-based transmission resources. The base station detects and collects statistics of an average scheduling delay of UEs in the schedule-based transmission mode, if the average transmission delay of the UEs in the schedule-based transmission mode is larger than a pre-defined fifth threshold, determines to add the schedule-based transmission resources.

In step 1907, the base station receives subsequent uplink data of the UE on the dedicated resources. In some embodiments, if receiving a data transmission completion indicator from the UE, the base station releases the dedicated resources.

In view of the above, embodiments of the present disclosure provide a grant-free data transmission solution. It realizes switching between the schedule-based transmission and the grant-free transmission through allocating dedicated resources for the UE during the grant-free transmission. As such, it is possible to ensure the delay and reliability of the subsequent data transmission through the dedicated resources, while keeping the low transmission delay advantage of the grant-free mode. Through the dynamic resource allocation, the problem of low resource utilization ratio in conventional grant-free transmission similar as semi-persistent scheduling can be solved. Meanwhile, the solution provided by the present disclosure solves collisions in the grant-free transmission through the allocation of the dedicated resources.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
   receiving, from a base station, resource allocation information for a grant-free transmission;
   transmitting, to the base station, uplink data by using grant-free transmission resources based on the resource allocation information, according to a predefined number of repetitions, wherein the transmitting of the uplink data comprises:
      if receiving a grant-free resource allocation indicator from the base station, receiving token bits corresponding to the terminal from the base station,
      counting a number of retransmission times,
      if the number of retransmission times exceeds a maximum retransmission number, detecting reserved resource allocation information according to information of the resources used by a last data transmission,
      determining reserved resources allocated for the terminal based on the detected reserved resource allocation information and the token bits, and
      transmitting data on the reserved resources;
   identifying a transmission amount of the uplink data according to the predefined number of repetitions;
   identifying whether the transmission amount is smaller than an amount of total uplink data;
   transmitting, to the base station, in case that the transmission amount is smaller than the amount of total uplink data, a request for dedicated resources;
   receiving, from the base station, dedicated resources allocation information; and
   transmitting, to the base station, a remaining portion of the total uplink data by using dedicated resources corresponding to the dedicated resources allocation information.

2. The method of claim 1, wherein, if the terminal is in a connected mode and has finished a random access procedure, the receiving the resource allocation information for the grant-free transmission from the base station comprises:
   receiving the grant-free resource allocation indicator transmitted by the base station via system information, a higher layer signaling, or a control channel.

3. The method of claim 1, wherein, if the terminal is in a non-connected mode, the receiving the resource allocation information for the grant-free transmission from the base station comprises:
   receiving an available resource pool configured by the base station via system information, a higher layer signaling, or a control channel, wherein the resource pool includes the grant-free transmission resources.

4. The method of claim 1, further comprising:
   indicating, to the base station, data transmission completion in a last uplink data transmission via a data transmission completion indicator.

5. The method of claim 1, further comprising:
   transmitting a dedicated resource request indicator included in the transmitting the uplink data by using the grant-free transmission resources;
   wherein the transmitting the remaining portion of the total uplink data using the dedicated resources to the base station comprises:
      receiving dedicated resource allocation information from the base station; and
      transmitting the remaining portion of the total uplink data using the dedicated resources corresponding to the dedicated resource allocation information to the base station.

6. The method of claim 1, wherein the request for dedicated resources is configured by buffer status report indicating whether the buffer is empty or not.

7. An apparatus for a terminal in a wireless communication system, the apparatus comprising:
   a communication interface;
   a storage unit; and
   at least one processor, coupled to the communication interface and the storage unit, configured to:
      receive, from a base station, resource allocation information for a grant-free transmission from a base station,
      transmit, to the base station, uplink data by using grant-free transmission resources based on the resource allocation information, according to a predefined number of repetitions, wherein the transmitting of the uplink data comprises:

if receiving a grant-free resource allocation indicator from the base station, receive token bits corresponding to the terminal from the base station, count a number of retransmission times, if the number of retransmission times exceeds a maximum retransmission number, detect reserved resource allocation information according to information of the resources used by a last data transmission, determine reserved resources allocated for the terminal based on the detected reserved resource allocation information and the token bits, and transmit data on the reserved resources, identify a transmission amount of the uplink data according to the predefined number of repetitions, identify whether the transmission amount is smaller than an amount of total uplink data, transmit, to the base station, in case that the transmission amount is smaller than the amount of total uplink data, uplink data transmission is not completed by using the grant-free transmission resources, a request for dedicated resources, receive, from the base station, dedicated resources allocation information, and transmit, to the base station, a remaining portion of the total uplink data by using dedicated resources corresponding to the dedicated resources allocation information.

8. The apparatus of claim 7, wherein the at least one processor is further configured to:

transmit a dedicated resource request indicator included in the transmitting a first part of the uplink data using the grant-free transmission resources;

for transmitting the remaining portion of the total uplink data using the dedicated resources to the base station, receive dedicated resource allocation information from the base station; and transmit the remaining portion of the total uplink data using the dedicated resources corresponding to the dedicated resource allocation information to the base station.

9. The apparatus of claim 7, wherein, if the terminal is in a connected mode and has finished a random access procedure, the at least one processor is further configured to:

receive the grant-free resource allocation indicator transmitted by the base station via system information, a higher layer signaling or a control channel; and receive an available resource pool configured by the base station via system information, a higher layer signaling or a control channel, wherein the resource pool includes the grant-free transmission resources.

10. The apparatus of claim 7, wherein, if the terminal is in a non-connected mode, the at least one processor is further configured to:

receive an available resource pool configured by the base station via system information, a higher layer signaling or a control channel, wherein the resource pool includes the grant-free transmission resources.

* * * * *